United States Patent [19]
Phillips

[11] Patent Number: 5,385,329
[45] Date of Patent: Jan. 31, 1995

[54] METHOD AND APPARATUS FOR ENHANCING STABILITY IN HYDRAULIC FLOW CONTROL

[75] Inventor: Edward H. Phillips, Troy, Mich.

[73] Assignee: Techco Corporation, Troy, Mich.

[21] Appl. No.: 85,349

[22] Filed: Jun. 30, 1993

Related U.S. Application Data

[63] Continuation-in-part of Ser. No. 17,283, Feb. 16, 1993, and a continuation-in-part of Ser. No. 28,252, Mar. 9, 1993.

[51] Int. Cl.⁶ .................................................. G05D 7/01
[52] U.S. Cl. ........................................ 251/77; 137/117
[58] Field of Search .................... 251/77; 137/101, 117

[56] References Cited

U.S. PATENT DOCUMENTS

| | | | |
|---|---|---|---|
| 4,388,941 | 6/1983 | Riedhammer | 137/117 X |
| 4,463,929 | 8/1984 | Dantlgraber | 251/77 X |
| 4,495,962 | 1/1985 | Hattori | 137/117 |

*Primary Examiner*—Robert G. Nilson
*Attorney, Agent, or Firm*—Gifford, Groh, Sprinkle, Patmore and Anderson

[57] ABSTRACT

A flow control valve having a piston and valve element connected together by a portion of a spring also connected to a pressure relief mechanism. Also disclosed is an alternative embodiment featuring a passage delivering metered flow from an input passage to a low pressure end of a piston and then through a pressure sensing means from the low pressure chamber to an output passage. A valving sub-assembly is movable to substantially suppress the flow rate ripple by bypassing a dominant portion of the flow rate ripple.

8 Claims, 13 Drawing Sheets

METHOD AND APPARATUS FOR ENHANCING STABILITY IN HYDRAULIC FLOW CONTROL

This is a continuation-in-part of copending application(s) Ser. No. 08/017,283 filed on Feb. 16, 1993 and Ser. No. 08/028,252 filed on Mar. 9, 1993.

BACKGROUND OF THE INVENTION

1. Field of the Invention

The present invention relates generally to flow control devices for hydraulic pumps and, more particularly, to enhancing the stability of flow control devices used in controlling the output of hydraulic pumps in power steering systems.

2. Description of the Prior Art

It is known in power steering circuits to control the output of the hydraulic pump with a flow control sub-assembly. Sub-assemblies and pumps of this type are produced by Saginaw Division of General Motors of Saginaw, Mich.; Ford Motor Co. of Dearborn, Mich.; and Honda Motor Co. of Japan. In the flow control sub-assembly, hydraulic flow is controlled by a piston which moves reciprocally in a flow control output cylinder to open and close a bypass hole. Hydraulic flow is delivered from the pump to an output chamber formed between a high pressure end of the piston in the flow control output cylinder and a pump output fitting. Fluid from the output chamber passes through a venturi in the flow control output fitting and on to the power steering system. The flow passing through the venturi is at a reduced pressure from the pressure in the output chamber. A pressure sensing orifice in the output fitting measures the reduced pressure in the venturi and delivers the pressure through passages in the housing to a low pressure chamber formed in the bore at an opposite end of the piston. A compression spring in the low pressure chamber biases the piston towards the output fitting to close the bypass hole. The combined force of the compression spring and the reduced pressure from the pressure sensing orifice oppose the pressure of the pump output acting on the high pressure end of the piston.

In addition, a pressure relief for fluid in the low pressure chamber is provided by a bypass device located in the piston. This function is activated whenever fluid pressure demand by the steering system exceeds a preselected bypass pressure value such as by a driver forcing the dirigible wheels against a curb. The bypass device's function is to pass fluid at any pressure value exceeding the preselected bypass pressure value directly into the bypass hole. The pressure sensing orifice then impedes the flow of fluid toward the low pressure chamber and its pressure value drops to the preselected bypass pressure value. This reduction of pressure enables the piston to compress the spring and move to a position whereat it partially uncovers the bypass hole and allows excess fluid to flow back to the pump via the bypass hole.

If flow issuing from the output flow nozzle is too great, then the force derived from the measured pressure differential between the pump output and the reduced pressure in the venturi will exceed the force provided by the compression spring and the flow control piston will move away from the end of the output fitting. The piston, then, partially uncovers the bypass hole to pass excess pumped fluid back toward an input port of the power steering pump and its reservoir. When a nominal design flow value is obtained, the piston is maintained in a first flow regulating position.

Should pressure demand increase in the system and the uncovered portion of the bypass hole conduct an excessive amount of pumped fluid to the reservoir, then the measured pressure differential between the output pump pressure and reduced venturi pressure decreases. The spring forces the piston back toward the end of the output fitting to a new flow regulating position to re-establish the design flow. Thus, the piston moves toward and away from the output fitting in response to changes in the system pressure demand.

The mass of the piston and hydraulic inductance of the passages in the housing comprise mass or mass-like elements, which are supported by the spring in a spring-mass system. The passages and the low pressure chamber form a substantially deadheaded hydraulic subsystem fed by the pressure sensing orifice in a series arrangement. Fluid flow through the pressure sensing orifice is related to pressure drop therethrough in a square law manner. As will be shown below, resistance to flow therethrough is proportional to either the square root of pressure drop, or alternately, fluid flow rate therethrough. However, since the pressure sensing orifice is feeding a substantially deadheaded hydraulic sub-system with concomitant nominally zero values of pressure drop and fluid flow rate therethrough, flow resistance has a value which is substantially zero. Thus, the sub-system forms a resonant hydro-mechanical subsystem which can be easily excited by bypass flow non-linearities to produce an unwanted oscillation of the piston. The oscillation may result in flow and/or pressure variations in the hydraulic flow delivered by the flow control sub-assembly to the power steering system. This is a servo system wherein these variations may combine with structural resonances present in the steering system and/or vehicle structure to produce a significant vibration known as "shudder" which can be felt by the driver. Stability problems associated with servo systems are discussed in DiStefano, Stubberud, and Williams in *Schaum's Outline of Theory and Problems of Feedback and Control Systems*, (McGraw-Hill Book Company, N.Y.).

Typically an engine operating at low speeds (especially when the engine is operated in a loaded condition such as being in gear with the air conditioner on) has significant variations in its speed. Since the pump is driven by the engine, it has substantially identical variations in both its speed and output flow rate. These output flow rate variations can easily excite the above described piston oscillations. These oscillations, in turn, can cause even more significant flow variations to the power steering system as mentioned above and described in detail below. The primary cause of the variation of engine rotational speed is the individual power pulses determined by the firing frequency of the engine's cylinders. A six cylinder engine has three power strokes per revolution and when operated at idle speed may have a firing frequency of about 36 Hz, and an associated rotational velocity ripple of approximately 10% from peak to peak. In addition, many engines also have a rotational velocity ripple at the fundamental frequency (or about 12 Hz for a six cylinder engine) with a concomitant rotational velocity ripple of perhaps 5% peak-to-peak. Because the pump is directly driven by the engine, these rotational velocity ripple characteristics concomitantly cause similar flow rate ripple in the output flow from the pump. Such low speed flow rate ripple can be coupled with systemic flow non-linearities described below to excite oscillation at frequencies near the resonant frequency of the above described spring-mass sub-system. This oscillation further exaggerates the flow variations.

The mechanism producing the oscillation can be demonstrated mathematically by the equations set forth below. The combination of the flow-pressure relationship for the pressure sensing orifice is defined by the equation $$Q_{pso} = A_{pso}\sqrt{2/\rho}\sqrt{P_{pso}}$$

and its flow resistance is defined by the equation $$R_{pso} = \frac{dP_{pso}}{dQ_{pso}} = \frac{1}{\frac{dQ_{pso}}{dP_{pso}}} = \frac{\rho Q_{pso}}{A_{pso}^2} = \frac{2\sqrt{P_{pso}}}{A_{pso}\sqrt{\frac{2}{\rho}}}$$

where $Q_{pso}$ is flow rate therethrough, $A_{pso}$ is effective area of the pressure sensing orifice, $\rho$ is fluid density, $P_{pso}$ is pressure drop therethrough and $R_{pso}$ is flow resistance therethrough. Since $P_{pso}$ and $Q_{pso}$ substantially have zero values in the deadheaded condition, $R_{pso}$ has a zero value also.

The resonant frequency of the system can be determined as follows. The spring constant can be transformed into an equivalent hydraulic capacitance by dividing its value into the square of the flow control piston area. The mass of the flow control piston can be transformed into an equivalent hydraulic inductance by dividing its value by the square of the flow control piston area. The values and their dimensions are $$C_h = \frac{A_p^2}{K_s}\left(\frac{in^5}{lb}\right)$$

$$L_p = \frac{M_p}{A_p^2}\left(\frac{lb \cdot sec^2}{in^5}\right)$$

where $C_h$ is the equivalent hydraulic capacitance of the spring constant, $A_p$ is the flow control piston area, $K_s$ is the spring constant, $L_p$ is the equivalent hydraulic inductance of the flow control piston mass and $M_p$ is the flow control piston mass. The total effective hydraulic inductance $L_t$ is obtained by adding hydraulic inductance $L_h$ and $L_p$. Hydraulic inductance $L_h$ is obtained by summing various hydraulic inductances contributed by each segment of the combined pressure sensing orifice and passages according to the equation $$L_{nh} = \rho\frac{l_{nh}}{A_{nh}}$$

where $L_{nh}$ is hydraulic inductance of the nth segment, $l_{nh}$ is length of the nth segment and $A_{nh}$ is cross-sectional area of the nth segment.

Resonant frequency can be found by $$f_n = \frac{1}{2\Pi}\frac{1}{\sqrt{L_t C_h}}$$

Typical values for the above parameters as found in production flow control sub-assemblies are in the order of $$C_h = 0.018\frac{in^5}{lb}$$

$$L_p = 0.002\frac{lb \cdot sec^2}{in^5}$$

$$L_h = 0.02\frac{lb \cdot sec^2}{in^5}$$

$$L_t = 0.022\frac{lb \cdot sec^2}{in^5}$$

from which the resonant frequency is found to be about $f_n = 8$ Hz.

Frequencies near this low resonant frequency are easily excited when such vehicles are subject to parking loads. The result can be resonance either at some sub-harmonic of the 36 Hz firing rate or the 12 Hz fundamental frequency itself. Thus, low frequency oscillations at frequencies such as 6 Hz, 9 Hz or 12 Hz are possible.

The flow non-linearities that can excite such oscillations include the following situations.

If the flow rate is too small to generate a pressure differential sufficient to cause the flow control piston to move against the pressure of the spring to a position where there is any opening of the bypass hole, then pump pressure supplementally increases to the point where the flow control piston is just lifted off the end of the output fitting. In this case, the flow resistance formed by the gap between the flow control piston and the end of the output fitting is just sufficient to support the supplemental pump pressure. If the pump flow is varying as described above, then this gap must vary as well and that initiates the oscillation. The oscillation then feeds upon itself and causes increased values of gap variation. This condition is further described below.

If the flow rate is just sufficient to activate the flow control piston-bypass hole interface and the flow is similarly varying, then the flow control piston is again driven into oscillation. In this case, the flow through the bypass hole has a significantly non-linear relationship with the pump variations and can even shut off during a cycle. This is quite sufficient to initiate a sub-harmonic oscillation of the above mentioned 36 Hz frequency signal. For a further discussion of stability problems in servo systems see DiStefano et al cited above.

The result can be unstable operation of the power steering system wherein it is subject to oscillations at these frequencies. Because the offending oscillation is due to an actual resonance, very significant perturbations of the open-loop gain and phase angle functions of the system result. The oscillations of the power steering system are the result of supplemental unity gain cross-overpoints in the open loop gain characteristic. It should be pointed out that these instabilities may very well be present in addition to others already present (i.e., such as shudder due to another unity gain crossover near 36 Hz). In any case, since any of these resonances result in significant flow and concomitant pressure variations being impressed directly across the power piston of the host steering gear, the phenomenon known as shudder occurs where a significant vibration is felt both in the vehicle structure and steering wheel.

SUMMARY OF THE INVENTION

Accordingly, the present invention is directed to methods and devices for reducing shudder in power steering system particularly in parking situations. The methods and devices are more particularly directed to eliminating instability in a steering system arising from oscillations of an otherwise resonant hydro-mechanical sub-system comprising a spring biased piston in a flow control device for a hydraulic pump. It is therefore an object of the invention to reduce the sub-harmonic resonance and, therefore, shudder occurring in the vehicle, particularly during parking maneuvers.

It has been found that the above mentioned resonant hydro-mechanical sub-system is, in fact, oscillatorially active under virtually all driving conditions. Further, all of the flow controlling orifices, both in the pump assembly and in the host power steering system's control valve, operate in a non-linear manner and the resulting pressure-flow relationships associated with the entire power steering system are also non-linear. Thus, although the precise physics underlying the resulting steering behavior is not understood it is evident that these non-linearities result in considerable system hysteresis whereby steering is routinely accomplished through a vale of apparent Coulomb-like friction. However, in practice it has been found that the above mentioned methods and devices of the present invention are useful in providing smooth and precise steering control under all driving conditions. It is therefore an additional object of the invention to eliminate system hysteresis and generally provide for improved smoothness and precision in vehicular power steering system operation generally.

In a preferred embodiment, an improved flow control sub-assembly is provided having a flow control cylinder and a pump output fitting with a venturi and a piston biased towards a flow control cylinder to close a fluid bypass hole. The piston is biased by a spring and pressure from a pressure sensing orifice formed in the output fitting. In general, the pressure sensing orifice senses reduced pressure of flow passing through the venturi. When the value of the reduced pressure in the fluid from the venturi, and the force of the spring are overcome, the piston moves to partially open the bypass hole. However, in the event that the supply of pressurized fluid from the pump is insufficient to move the piston, the fluid passes through a plurality of holes formed in a barrel of the output fitting. The combined area of the holes is at least three times the area of the venturi. Thus, the output flow path permits substantially unrestricted flow.

A first alternative preferred embodiment, directed to reducing the flow and pressure transients created by opening and closing the bypass hole, includes forming an annular bypass groove in the bore extending from the edge of the bypass hole axially toward the output fitting in combination with a balanced plurality of notches spaced circumferentially about an end of the piston. Each notch is provided with a sharp female corner. The bypass flow or orifice area between the end of the piston and bypass groove is determined by square law function of the axial position of the flow control piston and the change in the bypass orifice area is much more gradual than that provided by the interface between a conventional flow control piston and bypass hole.

A second alternative preferred embodiment is also directed to reducing flow and pressure transients created by movement of the piston across an edge of the bypass hole. A notch provided with a sharp female corner is formed in the bore extending from the edge of the bypass hole axially toward the output fitting. In this way the opening and closing of a similar bypass orifice is more gradually dismissed as the hole and notch are progressively closed by movement of the piston, thereby reducing the transients created by the closure in prior art devices.

A third alternative preferred embodiment enables the elimination of resonance by causing the pressure sensing orifice to acquire a non-zero value of flow resistance. The method of accomplishing this is to provide biasing flow of fluid therethrough of larger magnitude than any possible sensing flow, such that flow rate therethrough cannot achieve a zero value. Thus, hydraulic resistance is provided according to equation (2) presented above, wherein the biasing flow of fluid and concomitant pressure drop are used as $Q_{pso}$ and $P_{pso}$, respectively. The biasing flow is provided by forming a metering passage between an output chamber where fluid from the pump enters the flow control cylinder and the passage in the housing. The biasing flow then flows from the passage in the housing through the pressure sensing orifice to the venturi and on to the rest of the system. Generally, a biasing flow value at least sufficient to establish a hydraulic resistance equal to twice the value of the characteristic impedance value associated with $L_t$ and $C_h$ is utilized in order to over-damp motions of the piston. The characteristic impedance $Z_h$ is found by the equation $$Z_h = \sqrt{\frac{L_t}{C_h}}$$

A fourth alternative preferred embodiment similarly produces hydraulic resistance by causing a biasing flow $Q_{pso}$ to flow in a reverse direction through the pressure sensing orifice by forming a very small metering orifice in the piston. The metering orifice extends between a low pressure chamber and an annular groove on the piston in communication with the bypass hole. A very small size of the metering orifice is required because it is subjected to virtually the full system pressure, which may be in the order of 1000 psi instead of the reduced pressure of approximately 20 psi between the output chamber and the venturi.

A fifth alternative preferred embodiment utilizes an output fitting having an intermediate chamber formed between an output flow nozzle and a supplemental nozzle instead of a single venturi. A pressure sensing orifice samples pressure in the intermediate chamber. Thus, a hydraulic resistance seen by any flow through the pressure sensing orifice is the parallel combination of the hydraulic resistances of the output flow nozzle and the supplemental nozzle.

The following alternative preferred embodiments are effective in substantially suppressing a ripple flow rate by bypassing a dominant portion of the ripple flow rate.

A sixth alternative preferred embodiment includes bifurcating the piston via forming a valve element which is reciprocally movable with respect to the axial position of the piston to produce a supplemental valving action to permit relatively high frequency variations in the flow of excess fluid to exit through the bypass hole.

The valve element is spring biased by a Belleville spring washer toward the high pressure end of the flow control cylinder such that pressure fluctuations can deflect the valve element axially. Thus, minute but rapid changes in valving action can be effected without movement of the main piston mass or concomitant flow through the inductive passages in the housing and the pressure sensing orifice resistance (should it already have biasing flow according to the third alternative embodiment described above). Thus, sizable pressure fluctuations associated with fluctuations of pump flow output due to the engine rotational ripple mentioned above are substantially eliminated via the rapid changes in valving action which serve to pass the fluctuations of pump flow output directly back to the input port of the power steering pump. Usually, such valving action is enhanced by utilizing a bypass groove (such as that described above as part of the first alternative embodiment whereby a valve orifice extending through the complete circumference of the flow control cylinder is effected).

A seventh alternative preferred embodiment includes an accumulator piston mounted in a continuation of the bore forming the flow control cylinder and containing a flow control piston. The accumulator is externally biased by a spring toward a low pressure chamber. Thus, the spring can be formed in a more compliant manner by positioning it externally where it can occupy a larger volume.

In operation, the piston acts as an enhanced valve able to bypass increased values of pump flow fluctuations through a bypass groove and the bypass hole because its high frequency motions are mimicked by like motions of the accumulator piston.

An eighth alternative preferred embodiment of the present invention enables valving action according to either of the sixth or seventh alternative preferred embodiments described above whenever the value of the reduced pressure would otherwise be insufficient to overcome the product of the force provided by the spring and the piston area. An enlarged bore at a high pressure end of the output flow control cylinder and an enlarged high pressure end of the piston (or valve element) are provided. Thus, the force provided by the spring is partially opposed by pump output pressure acting upon the net difference in the areas of the high and low pressure ends of the piston. Further thus, a lower value of the reduced pressure is required to overcome the product of the force provided by the spring and the piston area and effect the above described valving action. The problem solved by the eighth alternative preferred embodiment is that many power steering pumps are sized such that excess pump capacity does not become available until engine speed is increased from idle speed by perhaps 50%. Thus, at low engine speeds, such as in parking maneuvers, the excess pump capacity is not available and the improved valving action obtained in either of the sixth or seventh alternative preferred embodiments is not yet active.

A ninth alternative preferred embodiment uniquely combines the functions of the spring biased valve element with an enlarged high pressure end by utilizing a Belleville spring washer mounted on the high pressure end of the piston as a compliant disk valve. In this case, the pump output fitting additionally comprises inlet ports for admitting hydraulic flow from the pump to an output chamber which is formed by a cavity therein. Excess fluid is bypassed between the Belleville spring washer and the end of the pump output fitting to an enlarged bypass groove. The transverse area enclosed by the sealing lip of the Belleville spring washer defines the effective high pressure end of the piston and can be sized as desired. Further, because the Belleville spring washer is unencumbered by the mass and flow constraints associated with the valve element and relief formed therein, respectively, it is unmatched in its speed of response to the rapid pressure variations.

In tenth and eleventh alternative preferred embodiments pressure and flow regulating piston assemblies each comprise a bifurcated piston with an enlarged valve element such as that described above in the eighth alternative preferred embodiment. However, in each of the areas of the low pressure end of the piston and high pressure end of the valve element are selected to have a preselected differential area. Then, the product of the differential area and the desired preselected bypass pressure value is substantially equal to the force provided by the compression spring. Thus, whenever that value of pressure is reached the spring force is overcome and the piston moves to a position whereat it partially uncovers the bypass hole thus allowing excess fluid to flow back to the pump via the bypass hole. Because of this, the bypass device normally located in the piston described above would be redundant and it is not used in the pressure and flow regulating piston assembly. The volumetric space normally utilized by the bypass device is occupied instead by a piston and enlarged valve element having simplified construction. In addition, the valve element is spring biased in a more compliant manner by a pair of Belleville spring washers mounted back-to-back. The pressure and flow regulating piston assemblies of the tenth and eleventh alternative preferred embodiments differ in that their method of fabrication is inverted.

In a twelfth alternative preferred embodiment a pressure and flow regulating piston assembly comprises a bypass device included within a piston element of a bifurcated piston sub-assembly. The bifurcated piston sub-assembly comprises a valve element that is spring biased by a pair of Belleville spring washers mounted back-to-back. In this case, valve and piston elements thereof are formed such that relative lateral position of the valve element is controlled directly by interface therebetween, and pitch and yaw of the valve element are controlled via mutual interface through the back-to-back Belleville spring washers. A coil spring formed with closed coils on a first end and middle thereof, and open coils on the second end is anchored in the piston near its center and in the valve element at its first end. When the bifurcated piston sub-assembly is assembled, closed coils near the first end are extended and used to retain the valve element while the open coils at and near the second end are compressed and used to urge the bypass device sealingly toward its seat. The circumferential surface of the valve element used to locate the bifurcated piston in the bore forming the flow control cylinder is formed in an axially foreshortened manner in order to inhibit binding therein. Because of this, an interrupted valve orifice is utilized whereby continuous portions of the bore support the foreshortened circumferential surface whenever it moves axially through the valve orifice location.

In a thirteenth alternative preferred embodiment teachings of the invention are employed with reference to a different type of flow control sub-assembly used in some vehicles manufactured by Honda Motor Co. In this flow control sub-assembly, hydraulic flow is also controlled by a high pressure end of a piston which moves reciprocally in a flow control output cylinder to open and close a bypass hole. However, in this case fluid is delivered to an output passage via an output flow control orifice on its way to an output fitting and on to the power steering system. A pressure sensing orifice directly connects the output passage to a low pressure chamber formed at an opposite end of the flow control output cylinder where the reduced pressure and a compression spring bear upon the opposite end of the piston to control the hydraulic flow. This flow control sub-assembly is superior in that it has markedly reduced values of hydraulic inductance because virtually the only small passage therein is the pressure sensing orifice. In addition, a light alloy is used for the piston with the result that the flow control sub-assembly's resonant frequency is about 25 Hz.

However, the resonance can be minimized by providing a biasing flow through the pressure sensing orifice. In this case, an additional high pressure passage is formed, thus, enabling formation of a metering passage into the low pressure chamber which conveys the biasing flow directly thereto. The biasing flow is then conveyed into the output passage by the pressure sensing orifice and on to the rest of the system in a manner similar to that described above.

In addition, use of a bifurcated piston subassembly, such as that described above with reference to the twelfth alternative preferred embodiment, is beneficial in eliminating net pump flow ripple. In fact, it has been found that use of bifurcated piston assemblies results in suppression of lower frequency harmonics of pump moan. Pump moan is due to higher frequency minute flow pulsations in pump output resulting from passage of each vane (or gear tooth in the case of some gear type power steering pumps) across pump ports. Pump moan is most noticeable when its fundamental or harmonic frequencies match delivery line resonances. Because valve elements of bifurcated pistons formed according to teachings presented herein do not encounter mechanical resonances below 2,000 Hz, pump moan sourced pump flow fluctuations to at least 1,200 Hz are also preferentially passed directly back to the input port of the power steering pump.

PREFERRED EMBODIMENTS OF THE INVENTION

Figure 1:
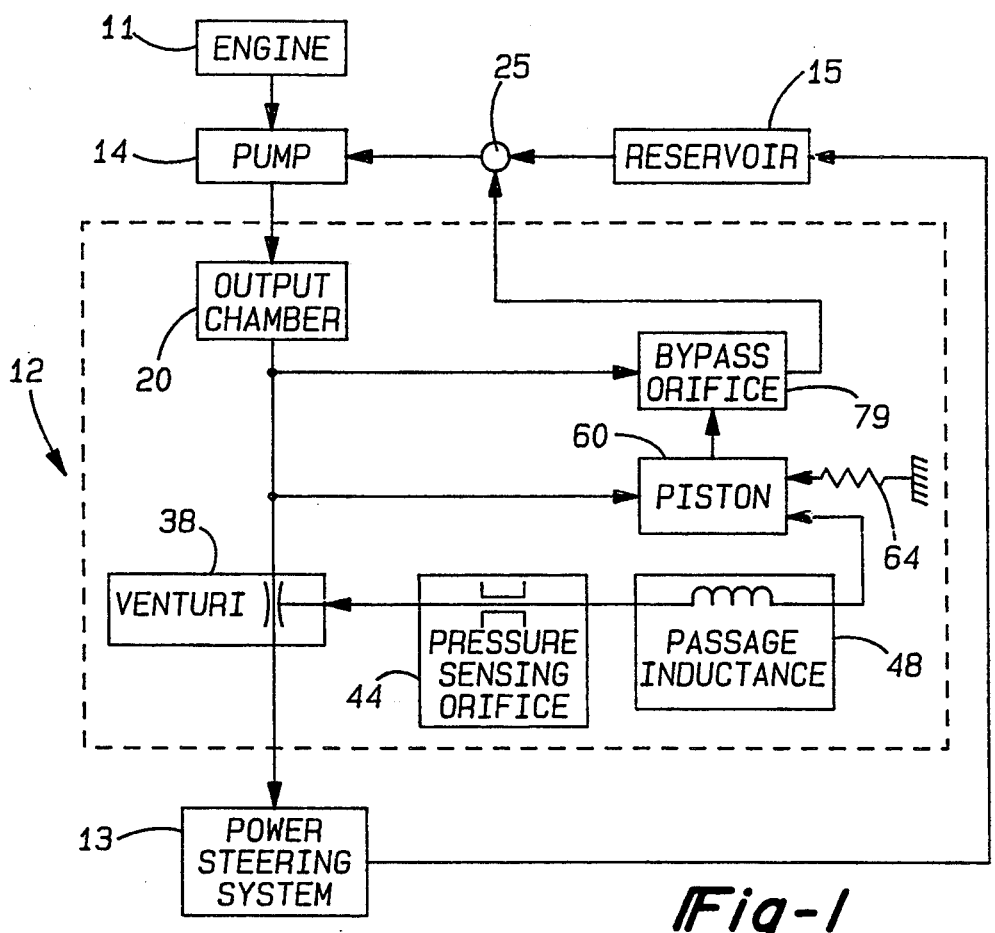
FIG. 1 is a block diagram showing a conventional power steering system.
Figure 3:
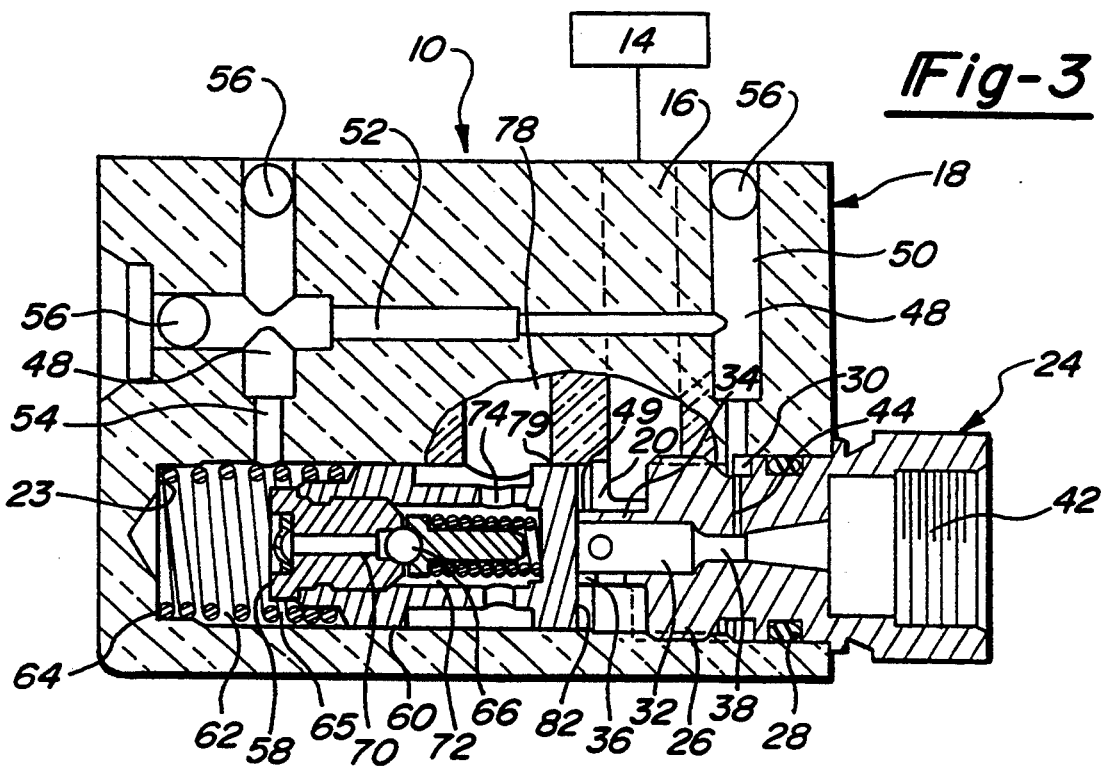
FIG. 3 is a sectional view of the flow control device showing a preferred embodiment of the invention.
Figure 2A:
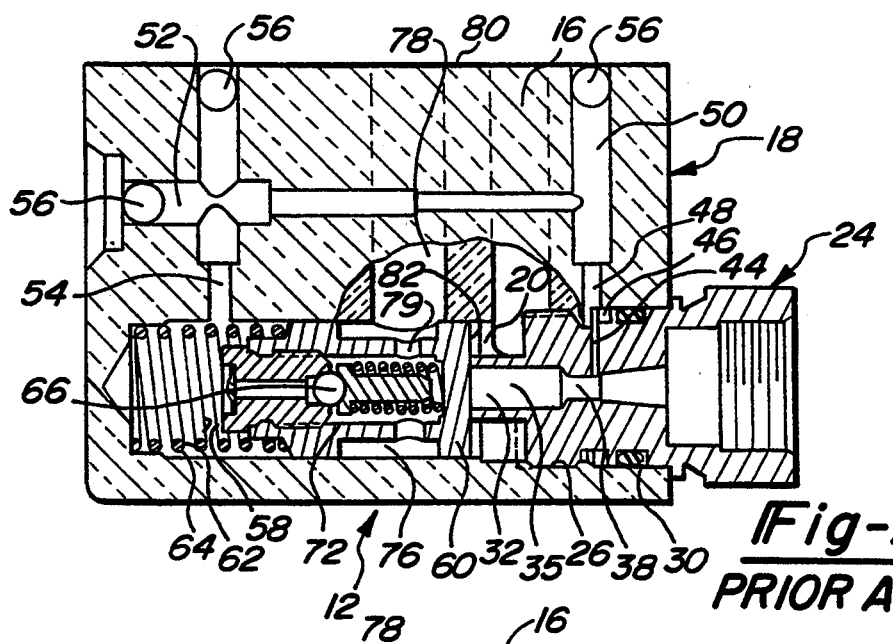
FIG. 2A is a sectional view of a flow control sub-assembly of the prior art showing a flow control piston in its fully closed position.
Figure 2B:
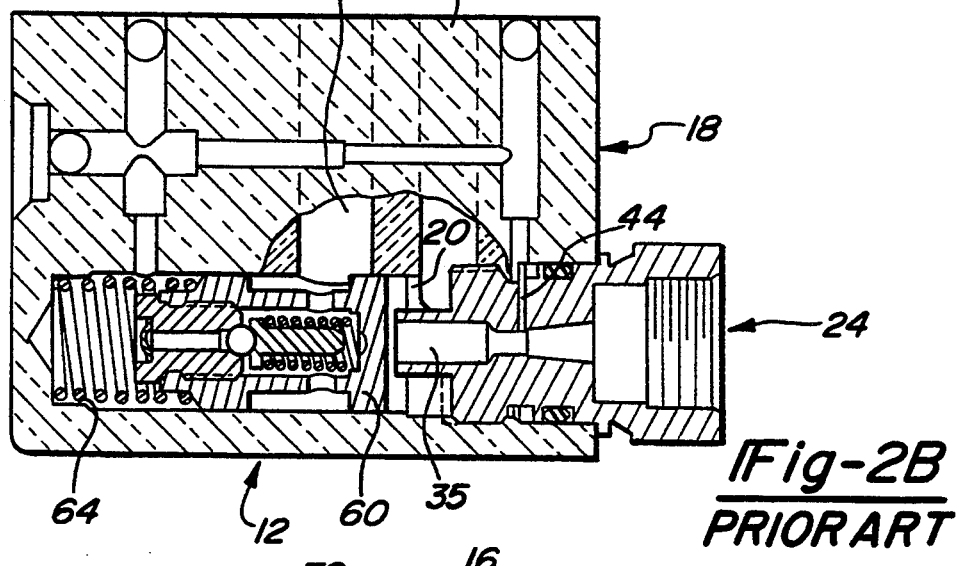
FIG. 2B is a sectional view of the flow control sub-assembly of the prior art showing the piston in a partially open position whereat a bypass hole remains fully closed.
Figure 2C:
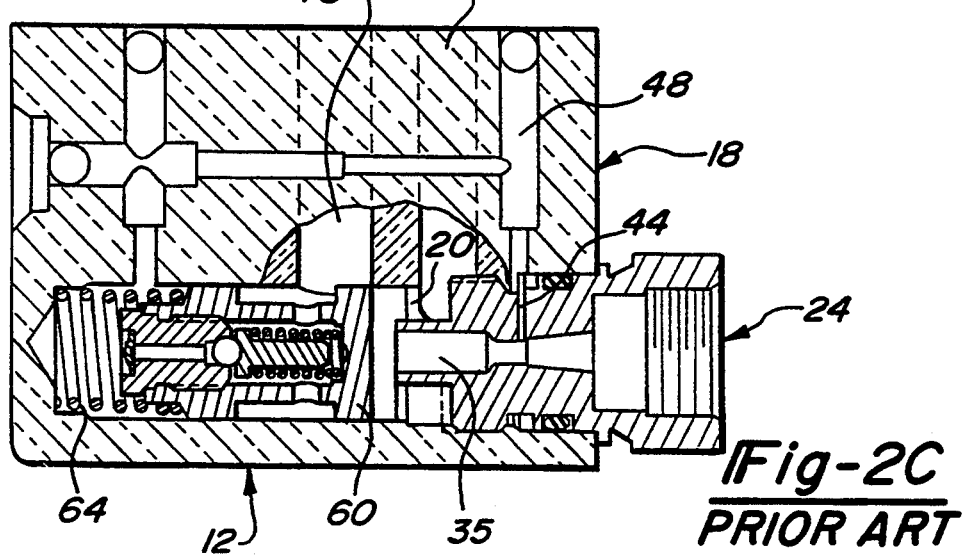
FIG. 2C is a sectional view of the flow control sub-assembly showing the flow control piston in a more fully open position whereat the bypass hole is partially uncovered.

The invention described herein, shown in FIG. 3, is an improvement of an output flow control device 10 for use in a conventional power steering system. A conventional power steering system is shown schematically in a block diagram of FIG. 1. In the block diagram of FIG. 1, an engine 11 is depicted as driving a pump 14 which provides pumped fluid to an output chamber 20 of a conventional flow control device 12. The pressure associated with the pumped fluid in the output chamber 20 is applied to a high pressure end 82 of a piston 60. The conventional flow control sub-assembly 12 is shown in FIGS. 2A, 2B and 2C, wherein the piston 60 is shown in closed, partially open and flow regulating positions, respectively. Fluid from the pump 14 passes through the flow control sub-assembly 12 to a power steering system 13 and back to a reservoir 15. As shown in FIGS. 2A, 2B and 2C, the conventional flow control sub-assembly 12 may include a partial inlet flow passage 39 (shown in phantom) associated with a cylindrical barrel 34 portion of an output fitting 24. If such a partial inlet flow passage 39 is included, a portion of the fluid flowing from the output chamber 20 flows therethrough to a venturi 38 and on to the power steering system 13. The rest of the fluid flowing from the output chamber is forced to flow through a radial flow passage 41 as indicated in FIG. 2B. In other cases the barrel 34 has no partial inlet passage 39, and all of the fluid flowing from the output chamber 20 is forced to flow through the radial flow passage 41 between the piston 60 and an end 36 of the barrel 34. As described above, the radial flow passage 41 is typically an unstable one which leads to instability in the flow control sub-assembly.

As shown in FIG. 3, where like elements have like reference numerals, the improved output flow control device 10 is conventionally formed integrally with or as the sub-assembly of a hydraulic pump 14, shown in schematic form in FIG. 3. However, the flow control device may be formed as a separate component of the steering system. A supply of pressurized fluid from the pump 14 is delivered through a passageway 16 in a housing 18 to an output chamber 20 formed in a flow control cylinder 22 having a piston 60. The cylinder 22 is closed at one end by a wall 23 formed in the housing 18 and is formed to receive the pump output fitting 24 at an opposite end. The output fitting 24 is mounted in the cylinder 22 by threads 26. An O-ring 28 is disposed in a circumferential groove 30 in the output fitting 24 to seal the cylinder 22. As shown in FIG. 1, the output fitting 24 retains a reservoir 15 in a position generally surrounding the housing 18. Extending from an inner end of the output fitting 24 is a cylindrical barrel 34 having an axial passageway 32. As is discussed more fully below, the barrel 34 has radially extending holes 35 to deliver fluid from the output chamber 20 to the axial passageway 32 when the piston 60 is in a fully biased position as shown in FIG. 3.

Both in the conventional flow control device 12 and the flow control device 10, fluid from the axial passageway 32 then passes through a flow control orifice or venturi 38 and delivers fluid to a threaded coupler 42. The coupler 42 is adapted to receive a fitting (not shown) of a hydraulic line for delivering the pressurized fluid to a conventional control valve of a hydraulic steering system. The pump output fitting often additionally comprises a diverging exit passageway 40 which serves to recover otherwise lost kinetic energy associated with the increased flow velocity through the venturi 38.

A pressure sensing orifice 44 extends radially through the output fitting 24 from the venturi 38 to a groove 46 circumferentially disposed between the groove 30 and threads 26 of the output fitting 24. The groove 46 communicates with a passageway 48 in the housing 18 formed of bores 50, 52, and 54. The bores 50, 52, and 54 are closed in any conventional manner, such as balls or plugs 56 to form the passageway 48. The passageway 48 communicates fluid from the pressure sensing orifice into a low pressure chamber 62 formed in the flow control cylinder 22 by a low pressure end 58 of the piston 60 and the end wall 23.

A coil spring 64 between the end wall 23 and annular recess 65 extending circumferentially around the low pressure end 58 of the piston 60 urges the piston 60 toward the end 36 of the barrel 34 of the output fitting 24 as shown in FIG. 2. The piston is, thus, biased toward the end 36 of the barrel 34 by the combined force of the spring 64 and the reduced pressure in the venturi 38 sensed by the pressure sensing orifice 44.

In the flow control device 10, in the event that the supply of pressurized fluid from the pump 14 is insufficient to cause the flow control piston 60 to lift-off from its fully biased position, all of the fluid passes through the radially extending holes 35. This contrasts with operation of the conventional, or prior art, flow control sub-assembly 12 as depicted in FIG. 2B wherein the piston 60 must lift-off in order to pass a significant portion or all (depending upon whether the cylindrical barrel 34 includes a partial inlet flow passage or not) of the fluid flowing from the output chamber 20 through the radial passage 41 to the axial passage 32. The lifting-off is a fundamentally unstable action because as the piston 60 lifts-off from the barrel 34, the portion of the area of its high pressure end 82 that is effectively exposed to the pressure of the pumped fluid in the output chamber 20 rapidly increases from the annular area surrounding the barrel 34 to the whole area of the high end pressure end 82 of the piston 60. As the effectively exposed area of the high pressure end 82 increases, an increasingly larger force is thereby applied to the piston 60 and its axial motion accelerates. The reverse is true when it is closing and it can even abruptly close off the flow passage 32. The result can be highly unstable flow operation with concomitant undesirable flow and pressure transients emanating through the power steering system 13.

As mentioned above, in some cases in the prior art, a partial inlet flow passage 39, having an orifice area generally smaller in size than the venturi 38 has been used to assist in lift-off. This rather small value of orifice area has proven to be insufficient to eliminate the problem because very significant pressure changes still occur. Utilization of the holes 35 in sufficient number and size in the flow control device 10 does cure the problem because remaining pressure changes become insignificant. Maintaining the net area of the radial holes 35 at least three times the area of the venturi 38 will result in a nine fold reduction in pressure change in the central area of the high pressure end of the piston 60.

Both in the conventional flow control device 12 and the flow control device 10, a pressure relief for fluid in the low pressure chamber 62 is provided by a ball 66 which is biased by relief spring 68 to block passageway 70. Thus, fluid from the low pressure chamber 62 passes through passageway 70 into a relief chamber 72 when force derived from its pressure on the ball 66 exceeds the force provided by the relief spring 68. The fluid then passes through radial passages 74 into a circumferential groove 76 and on to a bypass hole 78. The bypass hole 78 delivers the fluid to input port 80 of the pump 14 and to the reservoir 15.

Whenever fluid so passes from the low pressure chamber 62 a drop in pressure therein occurs. This is because that drop in pressure results from energy loss associated with concomitant flow outward through the pressure sensing orifice 44 toward the low pressure chamber 62 via the groove 46 and the passageway 48. This sudden change in pressure on the low pressure end 58 of the piston 60 allows the pressurized fluid from the pump 14 acting on the high pressure end 82 of the piston 60 to force the piston 60 to move away from the end 36 of the barrel 34 of the output fitting 24 and open a bypass orifice 79 into the bypass hole 78. Flow through the bypass orifice 79 toward the inlet port 80 of the pump 14 relieves the excess pressure which initiated the passage of fluid from the low pressure chamber 62. A new equilibrium operating condition is thereby established whereby the combination of the ball 66 and relief spring 68 act as a pilot valve for controlling the piston 60 such that the size of the bypass orifice 79 is sufficient to maintain pump output pressure at a nominal relief pressure value.

Flow control is accomplished as follows. The combined force of the compression spring 64 which is in the range of 7 lbs., and the force generated by the product of the piston area and the reduced pressure from the pressure sensing orifice 44 oppose the force generated by the product of the piston area and the pressure of the pump output in the output chamber 20 acting on a high pressure end 82 of the piston 60.

As the output flow from the pump 14 increases, the net force derived from the measured pressure differential between the pump output and the reduced pressure in the venturi 38 will exceed the force provided by the compression spring 64 and the piston 60 will move away from the end 36 of the barrel 34 of the output fitting 24 as operatively shown for the prior art devices in FIGS. 2A, 2B and 2C. The piston 60 then partially uncovers the bypass hole 78 to again form the bypass orifice 79 which passes excess pumped fluid back toward the input port 80 of the power steering pump 14 and the reservoir. When a nominal design flow value is obtained, the piston 60 is maintained in a first flow regulating position such as shown for the prior art device in FIG. 2C. Should pressure demand increase in the steering system and the bypass orifice 79 conduct an excess amount of pump fluid from the output chamber 20, the measured pressure differential between the output pump pressure and the reduced venturi pressure will decrease whereby the spring 64 will force the piston 60 back toward the end 36 of the barrel 34 to reestablish the design flow with the piston 60 in a new flow regulating position. Thus, the piston 60 moves toward and away from the end 36 of the barrel 34 of the output fitting 24 in response to changes in the system pressure demand.

As discussed above, the mass of the pistons and masslike character of the inductance of passageways being spring biased comprise resonant hydro-mechanical subsystems in previously known flow control subassemblies. The motion of their pistons is undamped because their pressure sensing orifices are square law devices which have substantially no flow resistance when deadheaded. Such a system can be easily excited by system non-linearities as demonstrated mathematically in the Background of the Invention.

Fluid in the venturi 38 is in hydraulic communication with the second or low pressure end 58 of the piston via the pressure sensing orifice 44 and passageway 48. Force due to the pressure associated with the fluid in the venturi 38 is summed with force provided by the spring 64 to oppose force due to the pressure associated with the pumped fluid in the output chamber 20 applied to the high pressure end 82 of the piston 60. If the available flow rate from the pumped fluid is at least sufficient to provide a value of measured pressure differential able to overcome the force provided by the spring 64, the piston will move far enough to open the bypass orifice 79 as is depicted in FIG. 2C. Then the radial flow passage 41 is opened up completely so that it is effectively non-existent and the bypass orifice 79 passes excess fluid back to the pump via a summing point 25 along with the fluid returning from the power steering system 13 via the reservoir 15.

Operation as depicted in either the block diagram of FIG. 1 or FIGS. 2A, 2B and 2C is influenced by a hydro-mechanical resonant circuit as follows: The mass of the piston 60 plus an equivalent mass-like element resulting from the inductance of passageway 48 is seen to form a resonant circuit with the spring constant of the spring. This is substantially undamped because, as described above, the pressure sensing orifice has minimal flow through it and therefore an essentially zero value of flow resistance.

Figure 4A:
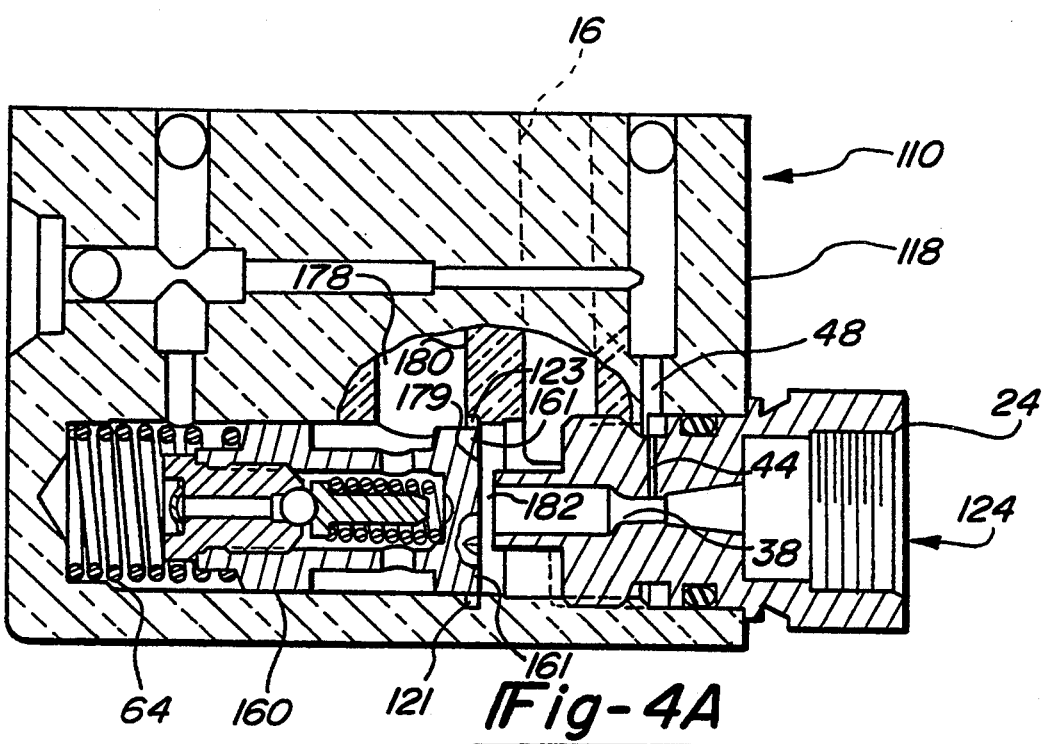
FIG. 4A is a sectional view showing a first alternative preferred embodiment of a flow control device of the invention.

A first alternative preferred embodiment of a flow control device 110 is shown in FIG. 4A. The flow control device 110 is directed to reducing non-linearities in the relationship between pump output pressure and axial motions of the piston 60 as it forms a bypass orifice 179 in conjunction with a bypass hole 178. A bypass groove 121 having a metering edge 123 located in a transverse plane which is substantially orthogonal to the axial direction of motion of the piston 160 along axis 124 defined by the flow control cylinder 22. The bypass groove 121 is located axially such that it is in hydraulic communication with the bypass hole 178 and the metering edge 123 is between edge 182 of the bypass hole 178 and the passageway 16.

Figure 4B:
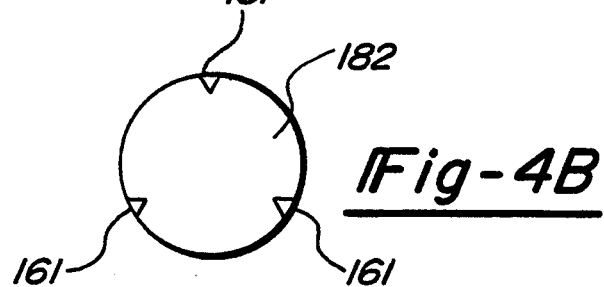
FIG. 4B is an end view of a high pressure end of a flow control piston as shown in FIG. 4A of the invention.

An improved flow control piston 160 having a balanced plurality of notches 161 having sharp female corners 163 is best shown in FIG. 4B. Thus, the bypass groove 121 communicates with the end of the bypass hole 178 and the balanced plurality of notches 161 of the piston 160 to form nominally equal bypass orifices 179 and effect a much more gradual opening and closing of the bypass orifices 179 than that described above with respect to bypass orifice 79. Because the area of the bypass orifices 179 is determined by square law function of the axial position of the piston, the interchange in the bypass orifices 179 is gradual as the piston closes the bypass orifices 179. The gradual change reduces the non-linearity of the relationship between pump output pressure and axial motions of the piston 60 and moderates the resonance of the piston 60.

Figure 4C:
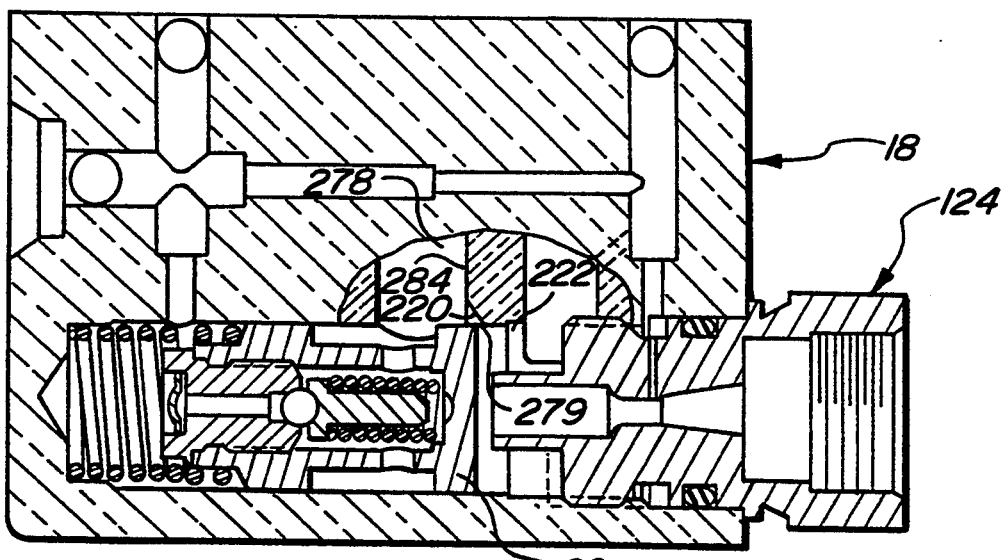
FIG. 4C is a sectional view showing a second alternative preferred embodiment of a flow control device according to the invention.

A second alternative preferred embodiment of a flow control device 210 is shown in FIG. 4C, where a notch 220 extends from a side wall 284 of a bypass hole 278 into a cylinder 222. The notch 220 has a wall angled at approximately 45° to the axis of the cylinder 222 and the wall 284 of the bypass hole 278 extends along a wall 222 of the cylinder a distance of approximately a tenth of the diameter of the bypass hole 278. In this manner, the area of a bypass orifice 279 formed thereby is reduced in a gradual fashion as the piston 60 closes the bypass orifice 279 to moderate the resonance of the piston 60 in the same way as discussed for the first alternative preferred embodiment above.

Figure 5A:
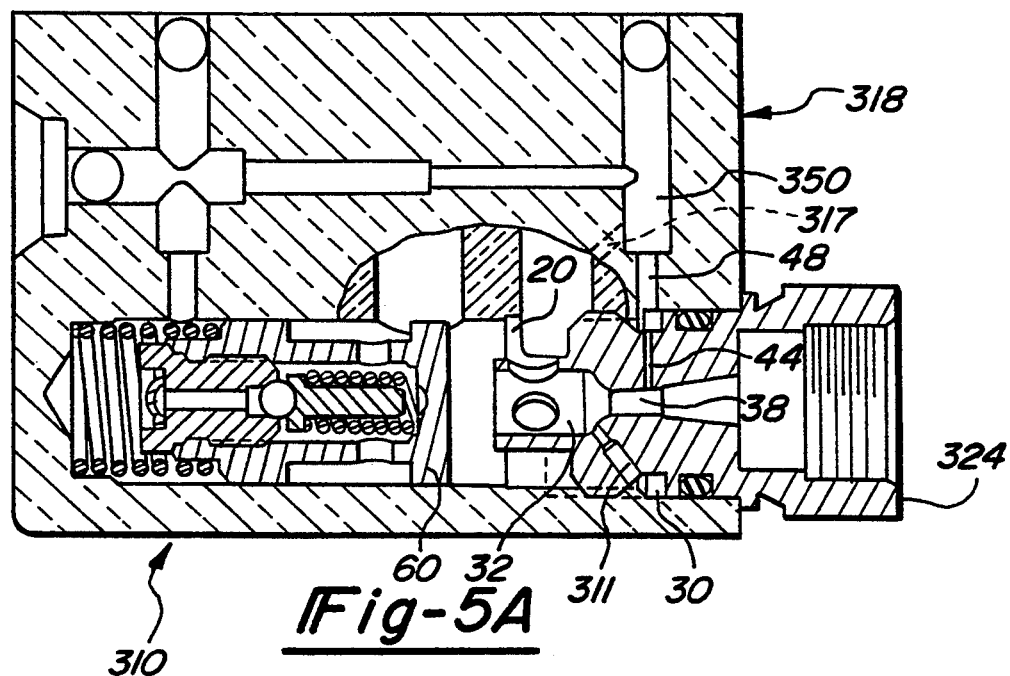
FIG. 5A is a sectional view of a third alternative preferred embodiment showing a flow control device according to the invention.

A third alternative preferred embodiment of the invention is shown in FIG. 5A, whereby the otherwise resonant hydro-mechanical sub-system comprising piston 60 of a flow control device 310 is dampened by causing a non-zero bias flow of fluid to pass through the pressure sensing orifice 44. This is accomplished by forming a metering passageway 311 in an output fitting 324 between the pressure sensing orifice 44 and the axial passageway 32 which passageway is at substantially the same pressure as the output chamber 20. The bias flow of fluid is urged to pass through the metering passageway 311 and the pressure sensing orifice 44 by the pressure differential between the output chamber 20 and the venturi 38. The metering passageway 311 is formed of a stepped bore 313 extending between the groove 30 which is in communication with the pressure sensing orifice 44. The parallel combination of the pressure sensing orifice 44 and passageway 311 act as a hydraulic resistor whose resistance value is selected to dampen fluid flow through passageway 48 and concomitant motions of the piston 60. Because pressure drop through the passageway 311 is nominally equal to the measured pressure differential between the output pump pressure and the reduced venturi pressure, that pressure drop is usually at least an order of magnitude greater than the pressure drop through the pressure sensing orifice $P_{pso}$. Thus, the hydraulic resistance of the passageway 311 is also significantly larger than that of the pressure sensing orifice 44 and is generally disregarded when calculating the resistance value of the hydraulic resistance $R_{pso}$. In any case, that resistance value is generally chosen such that motions of the piston 60 are at least critically damped. Thus, a resistance value of at least twice the characteristic impedance $Z_h$ of the reactive elements of the circuit is generally utilized. The characteristic impedance is found by the equation $$Z_h = \sqrt{\frac{L_t}{C_h}} = 1.1 \frac{\text{lb} \cdot \text{sec}}{\text{in}^5}$$

where $L_t$ is the total effective hydraulic inductance and $C_h$ is the equivalent hydraulic capacitance of the spring constant as calculated by equations 3, 4 and 5 above.

Since $\rho$, $A_{pso}$ and $R_{pso}$ (i.e., 2.2 [lb.sec/in$^5$] for critical damping) are known, equation (2) can be solved for the required values of $P_{pso}$ and $Q_{pso}$ as follows:

$$P_{pso} = \frac{(R_{pso}A_{pso})^2}{(2\rho)} \quad \frac{\text{lb}}{\text{in}^2}$$

$$Q_{pso} = \frac{(R_{pso}A_{pso}^2)}{\rho} \quad \frac{\text{in}^3}{\text{sec}}$$

As also shown in FIG. 5A, an alternate metering passageway 317 may be formed between the pressure sensing orifice 44 and the output chamber 20 in a housing 318. The metering passageway 317 is shown to extend from the bore 350 into the passageway 16. However, the passageway 317 may extend from bores 352 or 354 into the output chamber 20. In this case metered flow passes from the passageway or output chamber 20 through the stepped bore 319, bore 350, 352 or 354, groove 30 and the pressure sensing orifice 44.

Figure 5B:
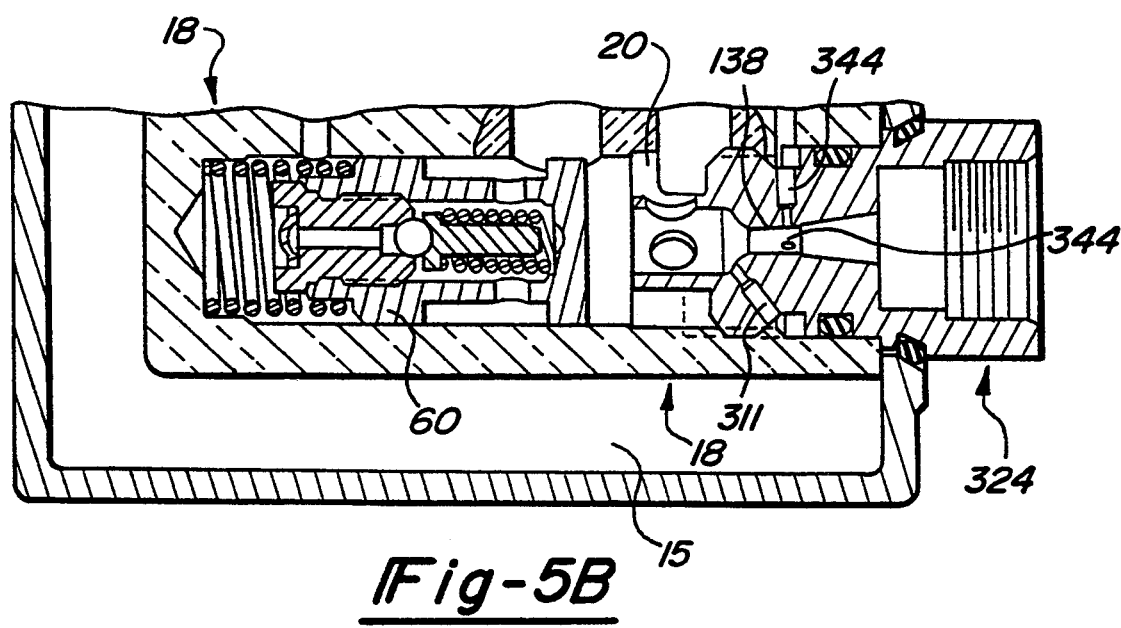
FIG. 5B is a sectional view of the third alternative preferred embodiment showing a flow control device having multiple flow sensing orifices.

It should be noted that the required pump output pressure will increase by the pressure drop through the passageway 317 (i.e., by the order of one psi). This, in turn, increases the flow through the venturi 38 slightly. To this must be added the value of $Q_{pso}$ itself. On the other hand, $Q_{pso}$, the volume of fluid flowing into the venturi tends to upset flow patterns within the venturi such as to reduce its effective size which tends to reduce flow therethrough. This effect can be reduced by introducing $Q_{pso}$ to the venturi in a distributed fashion by utilizing multiple pressure sensing orifices 344 each of smaller size and spaced uniformly around the circumference of the venturi 38 as shown in FIG. 5B. If it is desired to maintain the original output flow rate, then it is a simple matter to resize the venturi 38 accordingly.

FIGS. 2 through 5A are shown as section views taken along sections that comprise the passageway 48 in order to illustrate its function. However, these sections are non-orthogonal with respect to the pump 14 generally and do not clearly depict orthogonally formed elements such as the passageway 16 or the bypass hole 78. For this reason FIG. 5B and those depicting other flow control devices to be described below are taken along an orthogonal section. The flow control device is depicted as a sub-assembly of the pump and is shown in FIG. 5B to be submerged within the reservoir 15.

Figure 6A:
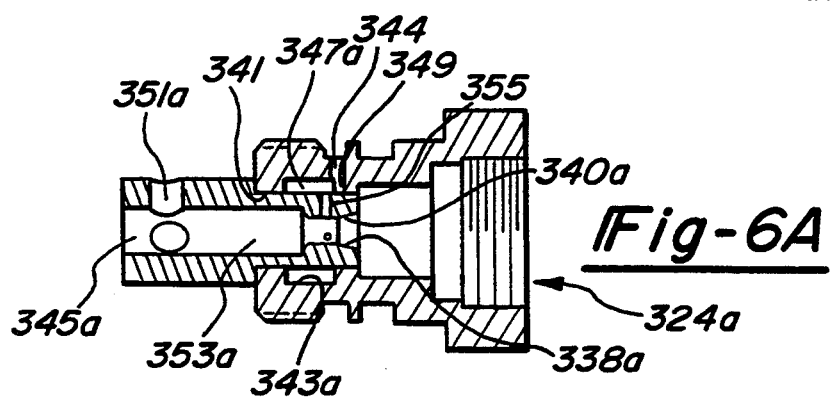
FIG. 6A is an output fitting according to the third alternative preferred embodiment.
Figure 6B:
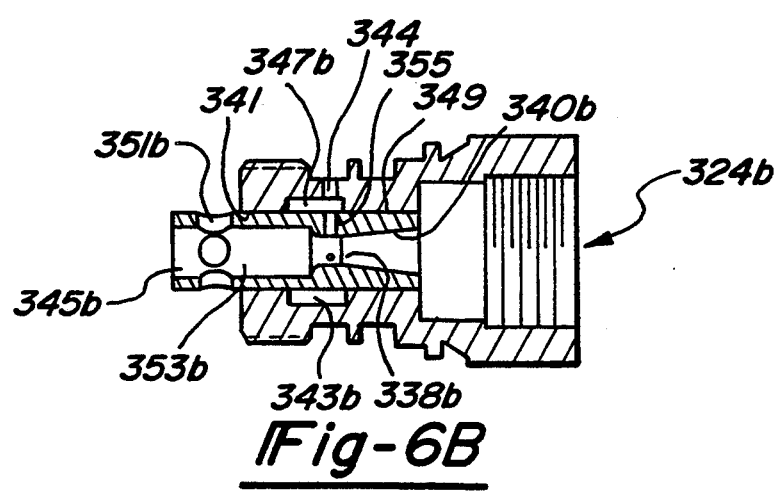
FIG. 6B is an alternative output fitting according to the third alternative preferred embodiment.

It has been found that a combination of the preferred embodiments shown in FIGS. 3 and 5B are particularly effective in substantially eliminating unwanted shudder conditions in a number of automotive vehicles of past and current production. Because of this it is particularly desirable to remanufacture output fittings originally manufactured by both Saginaw and Ford. FIGS. 6A and 6B depict a preferred method of effecting such remanufacture for output fittings 324a, 324b manufactured by Saginaw and Ford, respectively. In both FIGS. 6A and 6B the cylindrical barrel 34 of the conventional output fitting 44 is removed, and a bore 341 is formed therethrough with internal grooves 343 formed as well. New cylindrical barrel-venturi tubes 345a, 345b are interference fitted within the bore 341. Supplemental annular cavities 347a, 347b formed by a portion of the outer circumference 349 of the cylindrical barrel-venturi tubes 345a, 345b and the internal grooves 343 are disposed in a hydraulically parallel manner to the grooves 46 via radial holes 351a, 351b which are formed from an outward portion of the original pressure sensing orifice 44. The cylindrical barrel-venturi tubes 345a, 345b comprise axial passageways 353a, 353b leading to new venturis, 338a, 338b and diverging exit passageways 340a, 340b. A new metering passageway 317 formed of a radial bore 355 extending between the axial passageways 353a, 353b and the annular cavities 347a, 347b meters fluid to the annular cavities 347a, 347b from the axial passageways 353a, 353b (which are substantially at the same pressure as the output chamber 20) in a manner similar to the metering passageway 311 in the flow control device 310. Multiple pressure sensing orifices 344 are formed of radial bores in the wall of the venturi tubes 345a, 345b. Thus, the remanufactured output fittings 324a, 324b are substantially identical in function to those depicted in FIG. 5B.

Figure 7:
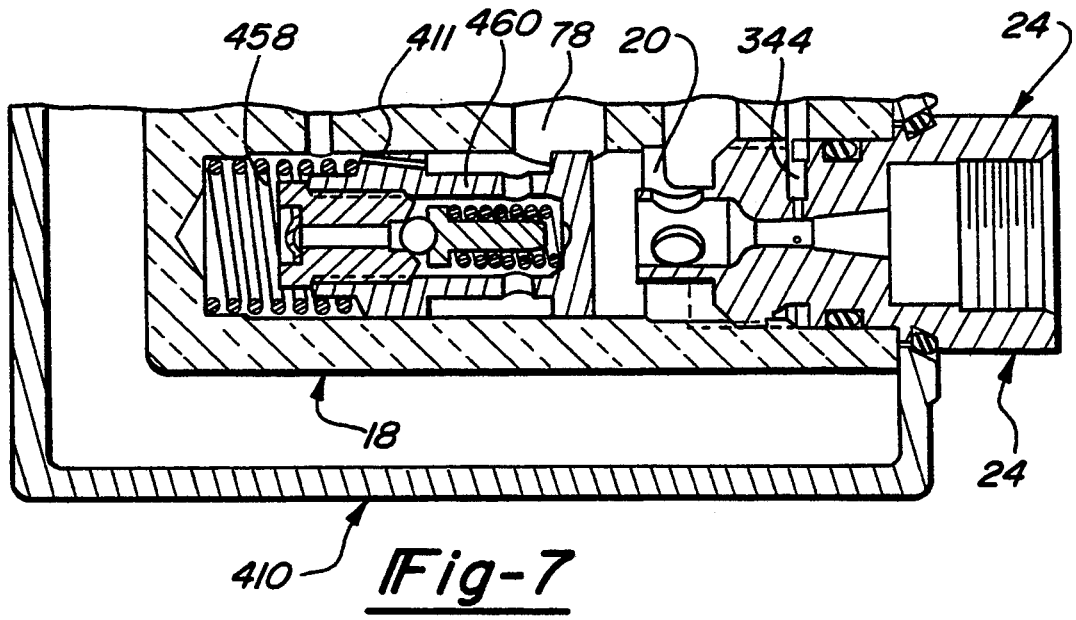
FIG. 7 is a sectional view of a fourth alternative preferred embodiment showing a flow control device according to the invention.

A fourth alternative preferred embodiment of a flow control device 410 is shown in FIG. 7. The flow control device 410 has a very small metering orifice 411 formed in a flow control piston 460. The metering orifice 411 extends between a low pressure end 458 of the piston 460 and a circumferential groove 476 communicating with the bypass hole 78. In this way, the $Q_{pso}$ flows in the reverse direction through the pressure sensing orifice 44 producing a hydraulic resistance. The metering orifice 411 must be very small because it is in communication with virtually the full steering system pressure which may be in the order of 1,000 psi. The resulting flow through the metering orifice is variable because of the varying system pressure. However, it is maximum at parking pressures where the shudder problem occurs. The hole may be of a diameter in the order of 15% of the diameter of the pressure sensing orifice 44 as calculated above.

Figure 8:
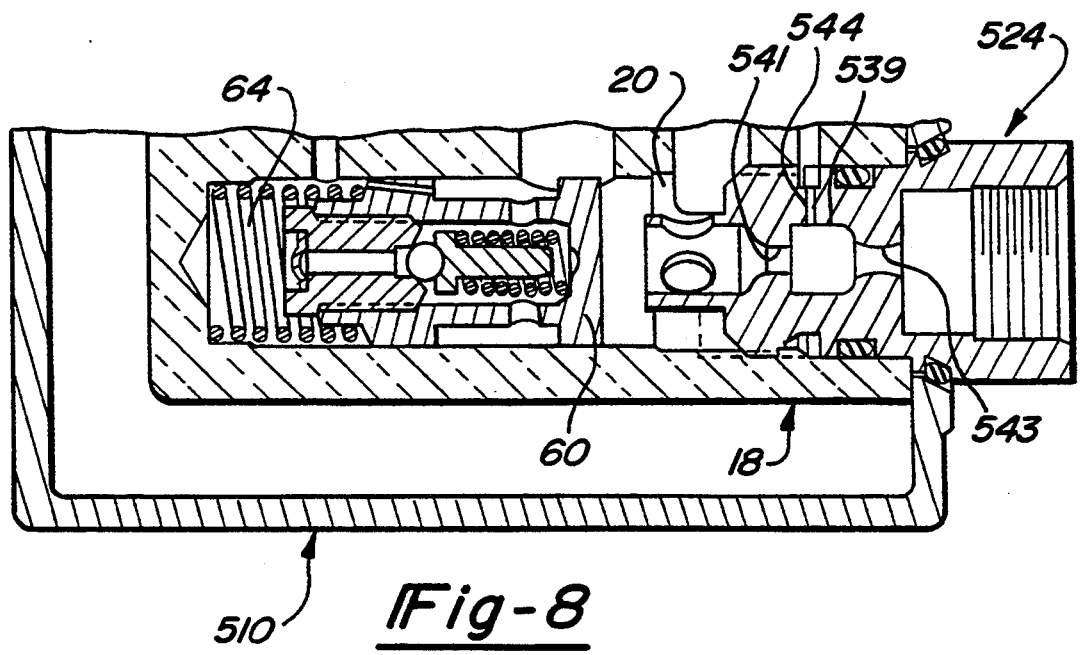
FIG. 8 is a sectional view of a fifth alternative preferred embodiment showing a flow control device according to the invention.

A fifth alternative preferred embodiment of flow control device 510 having a damping system using hydraulic resistance is shown in FIG. 8. The flow control device 510 is provided with an output fitting 524 provided with an intermediate chamber 539 in communication with a pressure sensing orifice 544. The intermediate chamber 539 is located between a cylindrical output flow nozzle 541 and a supplemental nozzle 543. The output flow nozzle 541 empties into the intermediate chamber 539 which has a diameter at least twice the size of the output flow nozzle 541.

The kinetic energy associated with system flow through both the output flow nozzle 541 and the supplemental nozzle 543 is lost in each case and similar hydraulic resistance equations pertain to each. The hydraulic resistance thus seen by any flow through the pressure sensing orifice is the parallel sum of the hydraulic resistances of the output flow nozzle 541 and the supplemental nozzle 539. In order to achieve appropriate values of hydraulic resistance, the pressure drops associated with the output flow nozzle 541 and the supplemental nozzle 543 generally have similar values. The energy values associated with each are totally lost in turbulence. On the other hand, there is minimal energy loss associated with hydraulic flow through a venturi such as the venturi 38 having a diverging exit passageway 40 because most of its kinetic energy is recovered via smoothly slowing the exiting hydraulic flow therethrough.

In previously discussed embodiments as well as the prior art flow control devices, the flow control valving action device has been limited by the response characteristics of the piston 60 as driven by fluid which must pass through the pressure sensing orifice and passageway 48. The piston 60 is unable to respond at frequencies associated with the above mentioned ripple frequencies. The advantage of the above mentioned preferred embodiments over the prior art flow control devices is that they are effective in suppressing the undesired enhancement of the flow rate ripple. However, the preferred embodiments discussed below are additionally effective in substantially suppressing the flow rate ripple itself by bypassing a dominant portion of that flow rate ripple directly back to the pump. The method utilized in suppressing the flow rate ripple is to allow concomitant pump output pressure ripple to modulate the bypass orifice 79. This is accomplished by utilizing a compliant or compliantly mounted valve element to define the bypass orifice opening valve.

Figure 9:
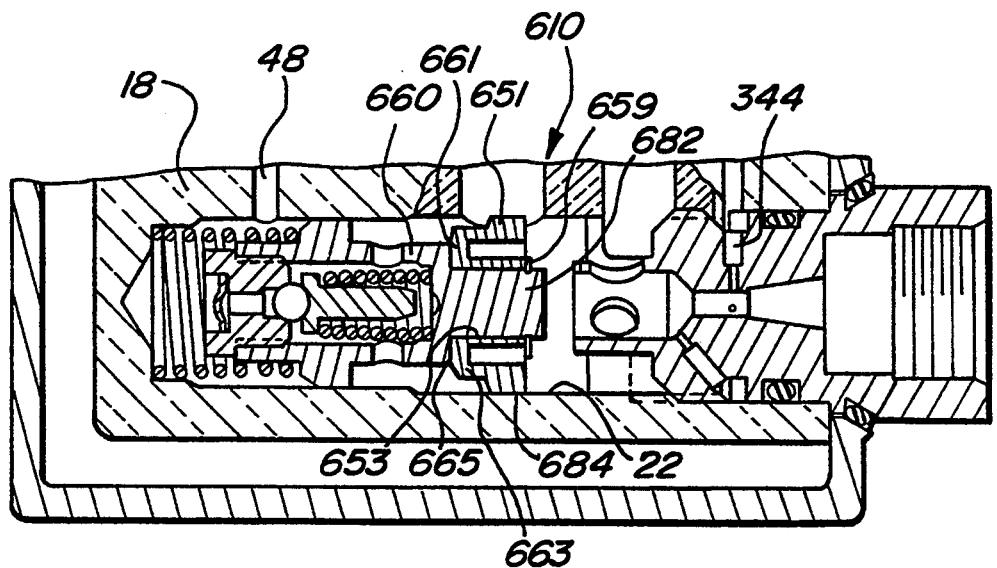
FIG. 9 is a sectional view of a sixth alternative preferred embodiment showing a flow control device according to the invention.

A sixth alternative preferred embodiment of the invention is shown in FIG. 9, where a flow control 610 includes a bifurcated piston assembly 660. A valve element 651 is mounted on an outer circumferential notch 653 formed on a high pressure end of the piston 682. The valve element 651 has a circumferential surface 684 that is sealingly disposed in the cylinder 22. The valve element 651 is held on the piston by a retaining ring 659 mounted in a groove on the piston. A Belleville spring washer 661 is positioned between an opposite end surface 663 and a radial surface 665 of the notch 653 of the piston 660. Because the valve element 651 travels only the distance which the Belleville spring washer 661 can be compressed, minute but rapid changes in valving action can be effected without movement of the piston 660 or flow through the inductive passages 48 in the housing 18 or the hydraulic resistance of the multiple pressure sensing orifices 344.

The rapid changes in the valving action serve to pass the fluctuations of the pump flow output directly back to the input port of the power steering pump. Usually such valving action may be enhanced by utilizing the bypass groove 121 shown in FIG. 4B and as discussed above as part of the second alternative embodiment whereby a bypass orifice 79 extending through the complete circumference of the cylinder 22 is effected. Thus, sizable pressure fluctuations associated with fluctuations of pump flow output due to the engine rotational speed variation mentioned above are substantially eliminated.

Figure 10:
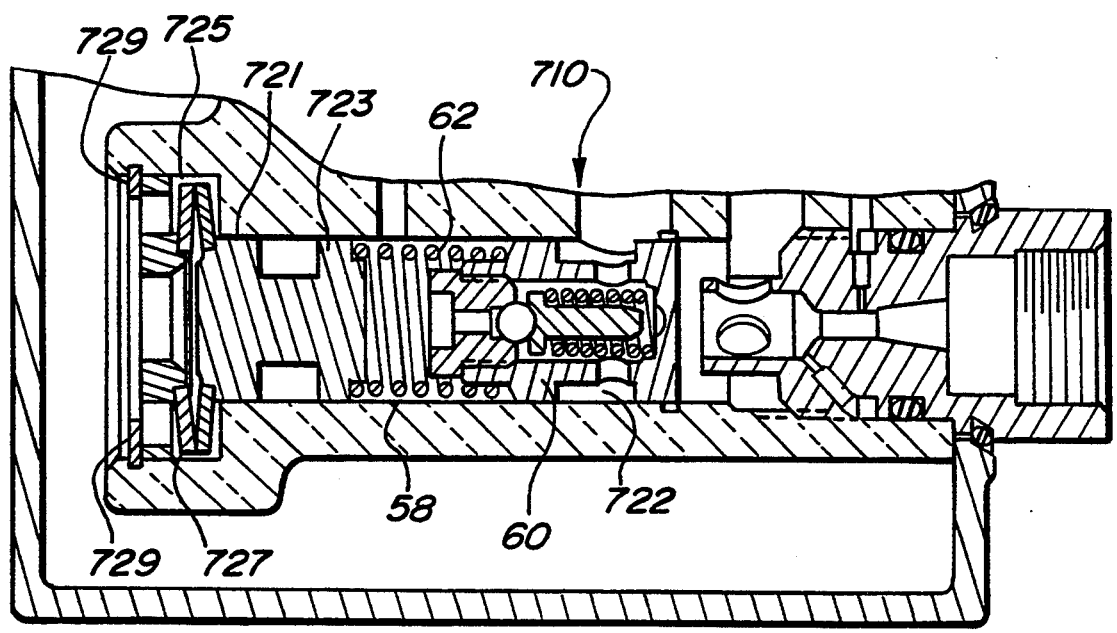
FIG. 10 is a sectional view of a seventh alternative preferred embodiment showing a flow control device according to the invention.

A seventh alternative preferred embodiment of a flow control device 710 is shown in FIG. 10, wherein an accumulator 721 is utilized to provide volumetric compliance for a low pressure chamber 62 formed in a cylinder 722 between the low pressure end 58 of the piston 60 and an accumulator piston 723. The accumulator piston 723 is spring-biased toward the low pressure chamber by Belleville spring washers 725 mounted in an external chamber 727. The externally mounted Belleville spring washers 725 are mounted back-to-back and are of significantly larger size than the Belleville spring washer 661. The washers are held in place by a retaining ring 729. Thus, the Belleville spring washers 725 provide a compliant cushion for the low pressure chamber 62 in order to allow larger axial motions of the piston 60 than are possible with the valve element 651 discussed in the sixth alternative preferred embodiment. The Belleville spring washers extend into the reservoir 15 such that it is not necessary to seal the external chamber. Although the flow control device 710 is shown comprising a piston 60, it could also comprise the piston assembly 660.

Figure 11:
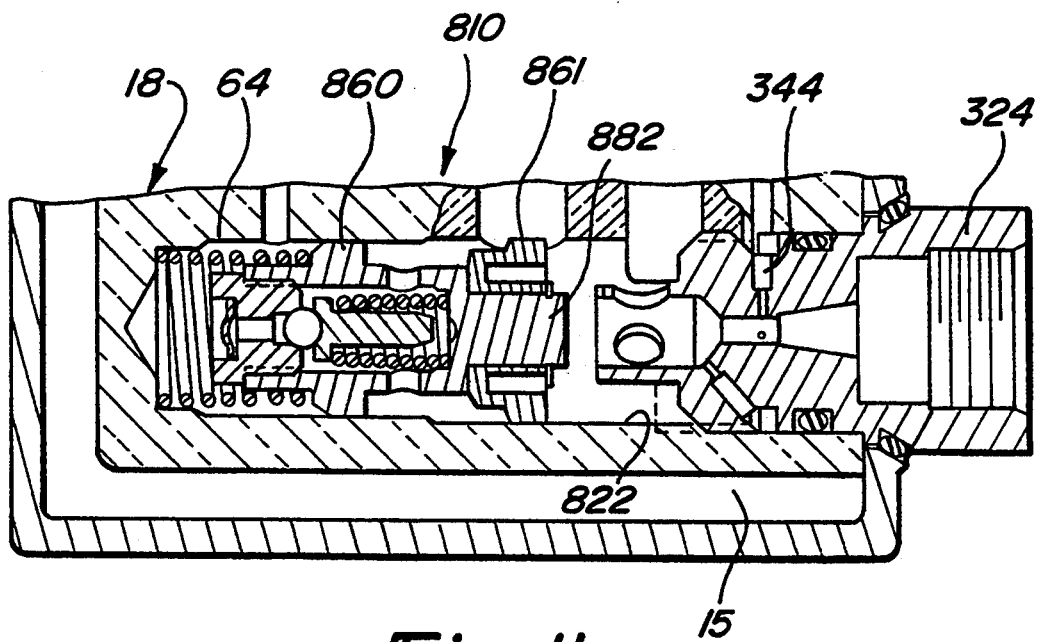
FIG. 11 is a sectional view of an eighth alternative preferred embodiment showing a flow control device according to the invention.

An eighth alternative preferred embodiment of a flow control device 810 is shown in FIG. 11, wherein an enlarged bore 822 is formed adjacent to a high pressure end 882 of a piston assembly 860. A valve element 861 in the piston assembly 860 is formed in an enlarged manner in order to fit the enlarged bore 822. Thus, the spring 64 is partially opposed by pump output pressure acting upon the net difference in the high and low pressure ends of the piston assembly 860 and a lower value of the reduced pressure measured by the pressure sensing orifice 344 is required to effect the valving action described above. Further thus, regulated output flow is reduced to a value comparable to the net pump output thus allowing the desired valving action to be operable, even at idle speeds.

Figure 12:
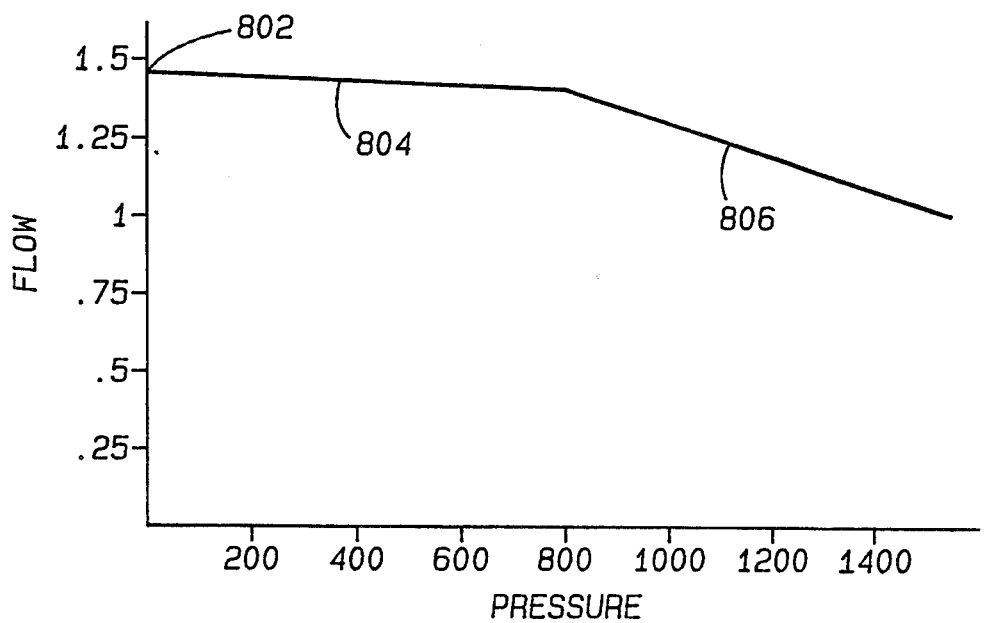
FIG. 12 is a graph showing flow vs. pressure of the invention according to the eighth alternative preferred embodiment.

FIG. 12 is a graph which depicts typical performance of the flow control device 810. The normally controlled flow rate for a power steering system utilized in this example is 1.6 gpm. However, as indicated by the y-axis ordinate intercept of segment 802, the zero pressure flow value is only about 1.44 gpm. Further, as depicted by the negative slope of segment 804, internal leakage of the pump further reduces delivery with respect to increasing output pressure. However, as depicted by segment 806, the controlled flow rate of the flow control device 810 decreases at a selected higher rate such that active flow control is established at about 750 psi in this example.

Figure 13:
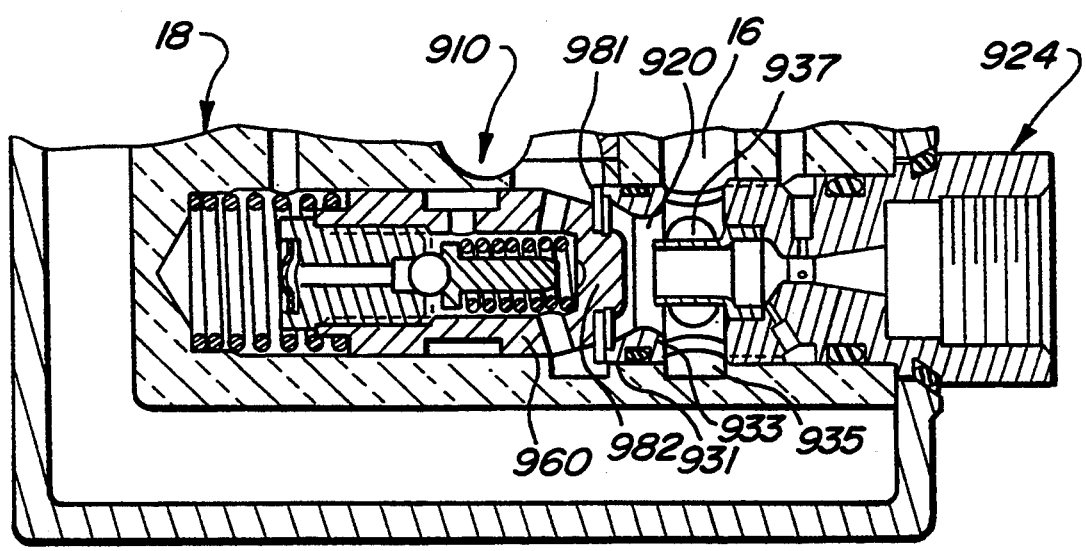
FIG. 13 is a sectional view of a ninth alternative preferred embodiment showing a flow control device according to the invention.

A ninth alternative preferred embodiment of a flow control device 910 is shown in FIG. 13. The flow control device 910 includes a compliant disk valve comprising a Belleville spring washer 981 mounted on a high pressure end 982 of a piston 960. The Belleville spring washer 931 provides valving action in combination with a transverse seat 933 formed on an axially extended portion 935 of an output fitting 924. The axially extending portion 935 of the output fitting 924 additionally comprises inlet ports 937 for admitting hydraulic flow from the passageway 16 in the housing 18 to an output chamber 920 formed therewithin. Valving action comprises passing excess fluid between the transverse seat 933 and the Belleville spring washer 931 is the effective diameter of the compliant disk valve. The Belleville spring washer 931 is usually formed with a larger diameter than that of the piston 960 in order to emulate the action of the piston assembly 860 as described above in the eighth alternative preferred embodiment. Because the Belleville spring washer 931 included in the compliant disk valve comprises minimal mass and influences minimal fluid in an inductive manner, it is unmatched in speed response.

Figure 14A:
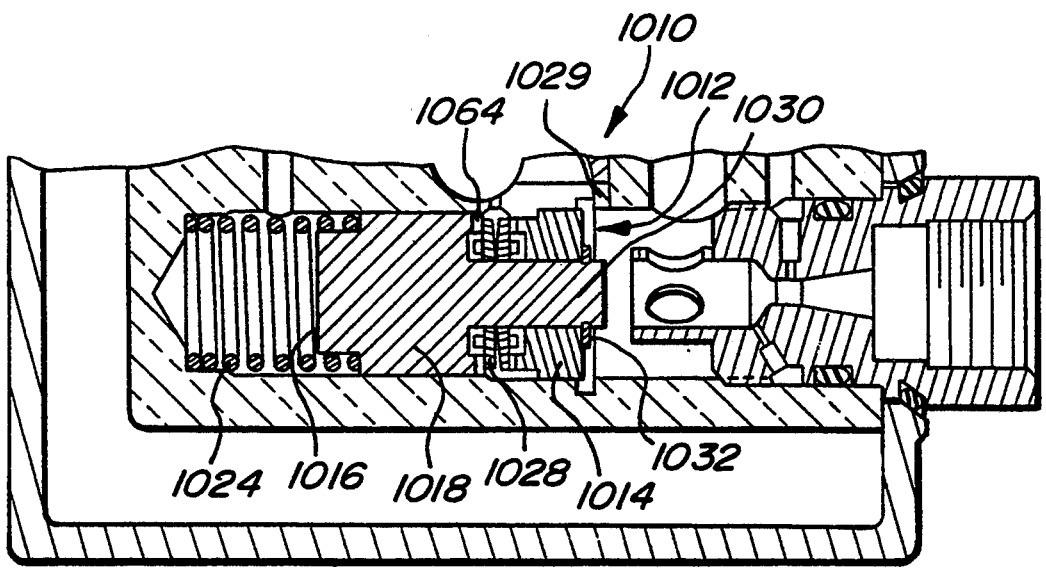
FIG. 14A is a sectional view of a tenth alternative preferred embodiment showing a flow control device according to the invention.

A tenth alternative preferred embodiment of a flow control device 1010 is shown in FIG. 14A. The flow control device 1010 comprises a bifurcated piston assembly 1012 with an enlarged valve element 1014 similar to that described above in the eighth alternative preferred embodiment. The valve element 1014 has a diameter greater than the diameter of the low pressure end 1016 of the piston 1018. These diameters are selected to produce a differential area between the areas of a low pressure end 1016 of piston 1018 and the valve element 1014. The force created by the product of the differential area and the desired preselected bypass pressure value is substantially equal to the force provided by compression spring 1024. Thus, whenever that value of pressure is reached, the spring force is overcome and the piston moves to a position whereat it partially uncovers bypass hole 1026 thus allowing excess fluid to flow back to the pump 14 via the bypass hole 1026. Because of this, a bypass device comprising a pressure relief for fluid in the low pressure chamber 1062 would be redundant and so it is not used in the bifurcated piston assembly 1012. The volumetric space normally utilized by such a bypass device is occupied instead by the piston 1018 and valve element 1014 having relatively simplified construction. In order to spring bias the valve element 1022 in a more compliant manner (than the valve element 651) a pair of Belleville spring washers 1028 are utilized in a back-to-back configuration. In addition, the valve element 1022 is held on piston extension 1030 by a retaining ring 1032.

Figure 14B:
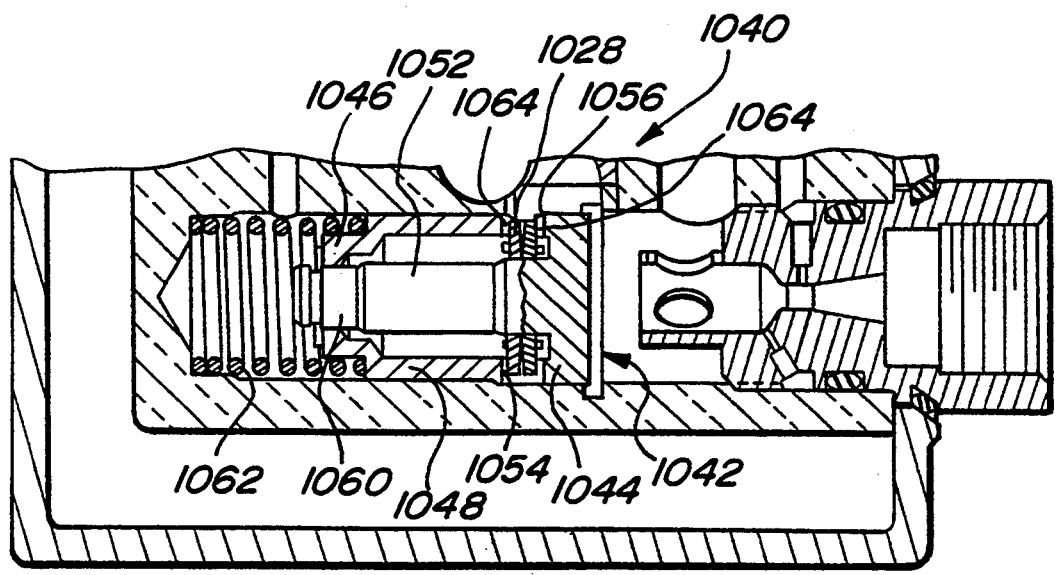
FIG. 14B is a sectional view of an eleventh alternative preferred embodiment showing a flow control device according to the invention.

An eleventh alternative preferred embodiment of a flow control device 1040 is shown in FIG. 14B. The flow control device 1040 comprises a bifurcated piston assembly 1042 with an enlarged valve element 1044. The valve element has an elongated portion 1052 extending axially through a piston 1048 to an extension 1060. The valve element 1044 is mounted to the piston 1048 by retaining ring 1064. A pair of Belleville washers 1028 are positioned on the elongated portion 1052 between an end 1054 of the piston and a rear face 1056 of the valve element 1044.

Functionally, piston 1048 and valve element 1044 of the bifurcated piston assembly 1042 operate in a similar manner to that of the bifurcated piston assembly 1012 described above. However, the interfacing structures are changed such that a high pressure end 1050 of the valve element 1044 comprises a complete disk shape and a low pressure end 1046 of the piston 1048 has a ring shape surrounding the valve element extension 1060. Functionally, the bifurcated piston assembly 1042 operates in an opposed motion manner wherein valve element 1044 and piston 1048 move toward and away from each other such that fluid displaced by motions of the low pressure end 1046 and valve element extension 1060 effectively cancels and net fluid displaced from low pressure chamber 1062 substantially has a zero value.

Figure 14C:
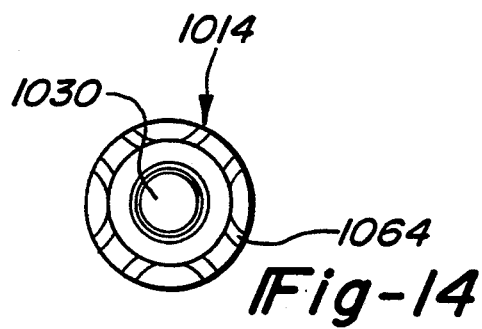
FIG. 14C is a view depicting flow passages typical of both the tenth and eleventh alternative preferred embodiments.

Flow passages 1064 are formed in the piston 1018 shown in plan view in FIG. 14C. The same passages are found in piston 1048 and valve elements 1044 and 1014 as shown in FIGS. 14A and 14B, and are utilized in both the tenth and eleventh alternative preferred embodiments for ventilating volumetric spaces 1066 behind Belleville washers 1028. As depicted in FIG. 14C the flow passages 1064 are formed in the manner of trepanned grooves. This type of groove construction is utilized in order to avoid interference with piston extension 1030 and valve element extension 1060 in flow control devices 1010 and 1040, respectively, during the manufacture of the flow control device.

Figure 15A:
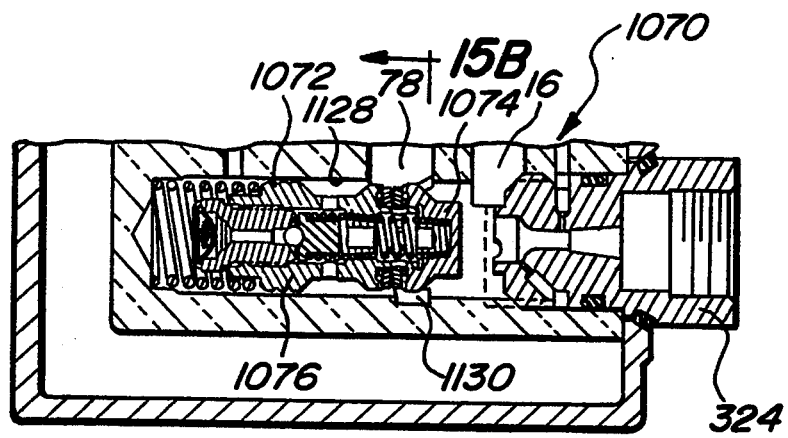
FIG. 15A is a sectional view of a twelfth alternative preferred embodiment showing a flow control device according to the invention.
Figure 15B:
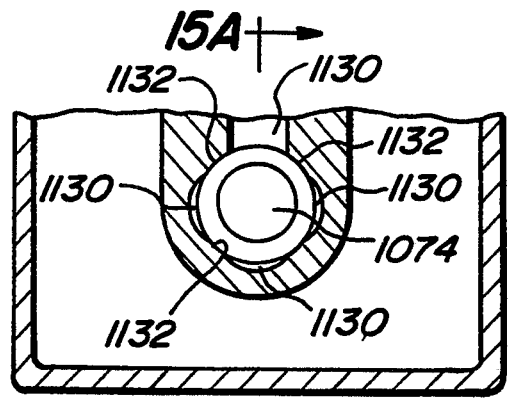
FIG. 15B is an orthogonal sectional view of the twelfth alternative preferred embodiment showing an interrupted valve orifice comprised therein.
Figure 16:
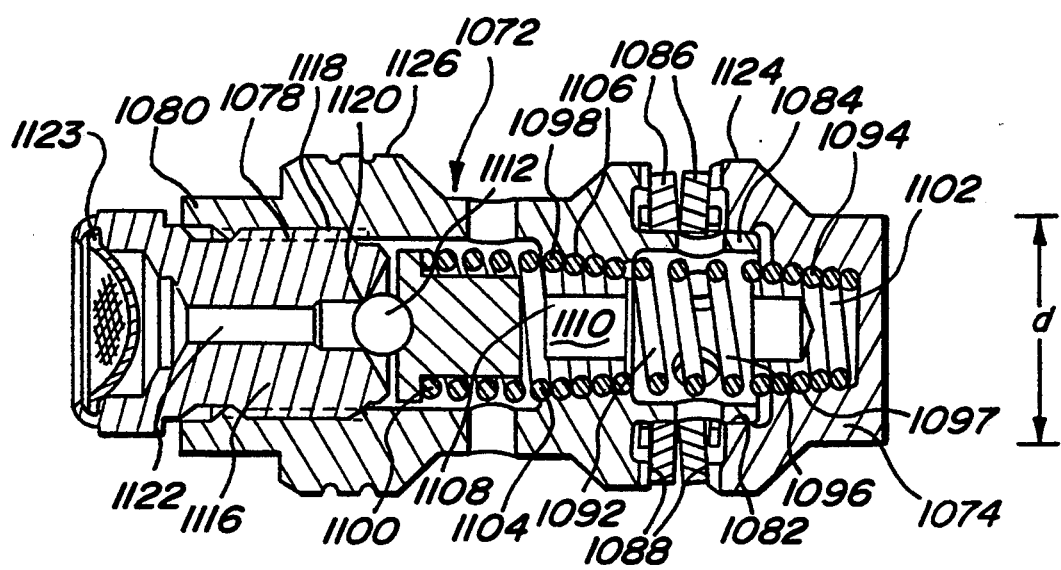
FIG. 16 is a sectional view of a bifurcated piston utilized in the twelfth alternative preferred embodiment.

A twelfth alternative preferred embodiment of a flow control device 1070 is shown in FIGS. 15A, 15B and 16. The flow control device 1070 comprises a bifurcated piston sub-assembly 1072 including a valve element 1074, piston 1076 and a bypass device 1078. The valve element 1074 may be formed with a diameter "d" either the same size as, or greater than, the diameter of a low pressure end 1080 of the piston 1076. The valve element 1074 is located laterally by internal bore 1082 thereof sliding upon a circumferential portion 1084 of the piston 1076. A pair of Belleville spring washers 1086 are utilized in a back-to-back configuration to support the valve element 1074 in pitch and yaw directions, and axially in a spring biased manner. Belleville spring washers 1086 are seated upon shoulders 1088 of valve element 1074 and piston 1076 which are configured as flat surfaces with flow passages 1090 formed therein as described above with reference to FIG. 14C.

A coil spring 1092 is formed with tapered closed coils 1094 on a first end, uniform closed coils 1096 and tapered closed coils 1098 in a middle portion thereof, and open coils 1100 on the second end. During assembly of the bifurcated piston sub-assembly 1072, internal nuts 1102 and 1104 are positioned within tapered closed coils 1094 and 1098, respectively. Then the tapered closed coils 1098 are rotationally inserted within taper threaded bore 1106 of the piston 1076 and are anchored therein by the internal nut 1104. Next, the Belleville spring washers 1086 are mounted upon the circumferential portion 1084, and the internal nut 1102 is pushed axially (via a rod [not shown] through access hole 1108 formed in internal nut 1104) to extend the uniform closed coils 1096. A threaded bore 1097 of valve element 1074 is rotationally received on the tapered closed coils 1094 and the valve element 1074 is anchored thereon by internal nut 1102. The axial tension force provided by the extended uniform closed coils 1092 retains valve element 1074 and slightly preloads Belleville spring washers 1086.

During assembly of bypass device 1078, ball mount 1110 is inserted into open coils 1100 and ball 1112 is positioned thereon. Then threaded circumference 1114 of ball seat 1116 is coated with an adhesive material and rotationally inserted within threaded bore 1118 of piston 1076. According to a known test procedure, ball seat 1116 is rotationally, and therefore axially, positioned such that ball 1112 remains sealingly seated in seat portion 1120 of passageway 1122 until a selected relief pressure is attained. The passageway is covered by a screen 1123. Then the adhesive material is allowed to cure and assembly of the bifurcated piston sub-assembly 1072, including the bypass device 1078, is complete.

Circumferential surfaces 1124 and 1126 are used to locate valve element 1074 and piston 1076, respectively, in flow control cylinder 1128. The circumferential surface 1124 is formed in an axially foreshortened manner in order to inhibit binding in flow control cylinder 1128 (i.e., should it be located therein with a non-zero value of axial runout due to imperfections such as Belleville spring washers 1086 being formed with non-parallel sides). In fact, circumferential surface 1124 is formed shorter than the axial length of bypass groove 1130. With particular reference now to FIG. 15B, bypass groove 1130 is formed in a discontinuous manner whereby continuous portions 1132 of the flow control cylinder 1128 separate bypass passages 1134. This forms an interrupted valve orifice and yet allows circumferential surface 1124 to be supported for continuous and smooth motion within flow control cylinder 1128. The bypass passages 1134 communicate with bypass hole 78 by an annular groove surrounding the Belleville spring washers 1086.

Figure 17A:
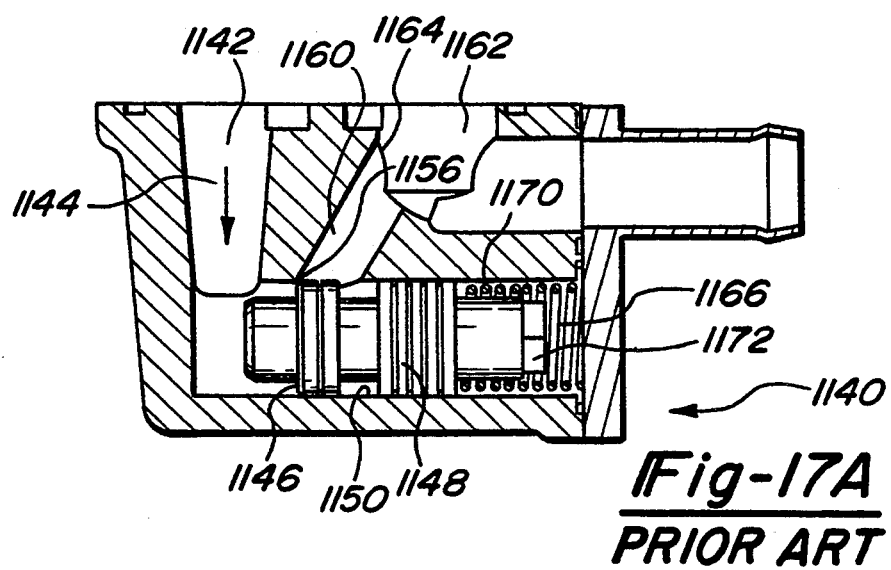
FIGS. 17A, 17B and 17C are orthogonal sectional views of a flow control sub-assembly of the prior art showing a low flow inductance pressure sensing path.
Figure 17B:
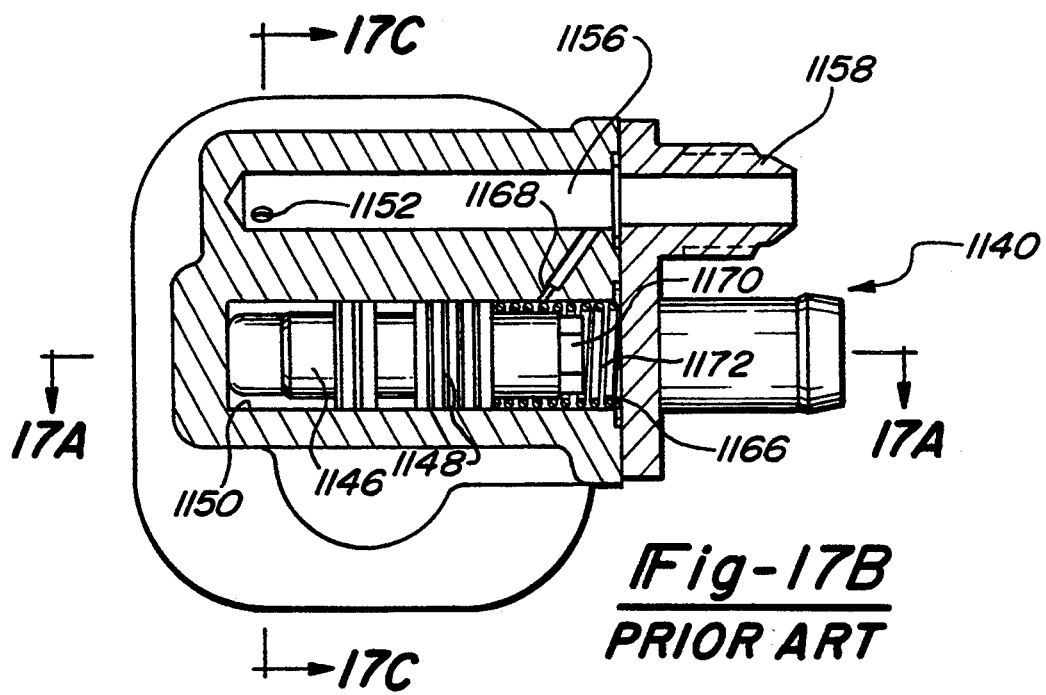
Figure 17C:
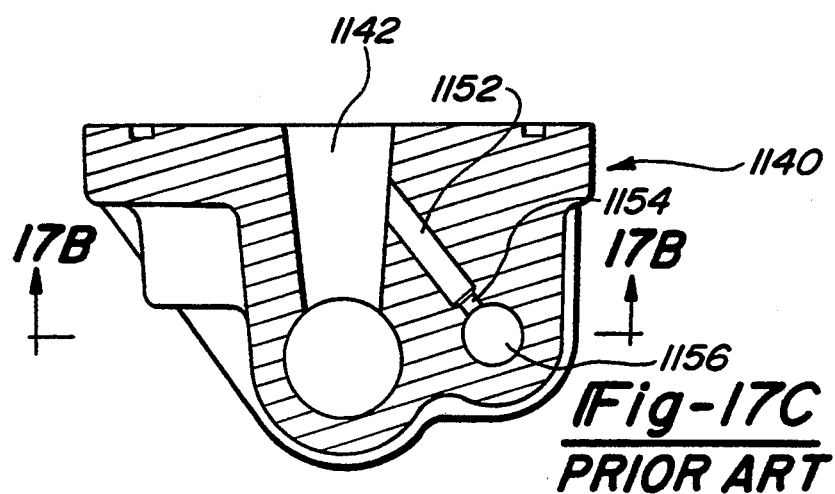

Teachings of the present invention may be employed with reference to other flow control sub-assemblies found in the prior art as well. Shown in FIGS. 17A, 17B and 17C is an output flow control device 1140 of the prior art used, for instance, in some vehicles manufactured by the Honda Motor Co. In output flow control device 1140, pumped fluid is provided to an output chamber 1142 by a pump (not shown) as indicated by flow direction arrow 1144. Pressure therefrom is applied to high pressure end 1146 of a piston 1148 located in a flow control cylinder 1150. Fluid delivered to a power steering gear (not shown) passes through an interconnecting passage 1152 and an output flow control orifice 1154 to an output passage 1156 at lower pressure. The fluid then passes on to the power steering gear via output fitting 1158. As discussed above with reference to FIG. 2C, if high pressure end 1146 of piston 1148 uncovers bypass hole 1160, then excess pumped fluid is bypassed back to pump input chamber 1162 via bypass hole 1164. Low pressure fluid is provided to low pressure chamber 1166 directly via pressure sensing orifice 1168 where it acts upon low pressure end 1170 of piston 1148 along with compression spring 1172.

Output flow control device 1140 is superior to output flow control device 10 in that it has markedly reduced values of hydraulic inductance because virtually the only small passage therein is provided by pressure sensing orifice 1168. In addition, a light alloy such as hard anodized aluminum is used for piston 1148 with the result that total effective hydraulic inductance is reduced by about an order of magnitude from the value calculated in equation (10) above. Thus, resonant frequency and characteristic impedance of output flow control device 1140 are each changed by approximately a factor of three to about 25 Hz and 0.36 lb.sec/in$^5$, respectively. However, any remaining tendency toward resonance can be minimized by providing a biasing flow through pressure sensing orifice 1168 in much the same manner as described above with reference to FIG. 5A.

Figure 18A:
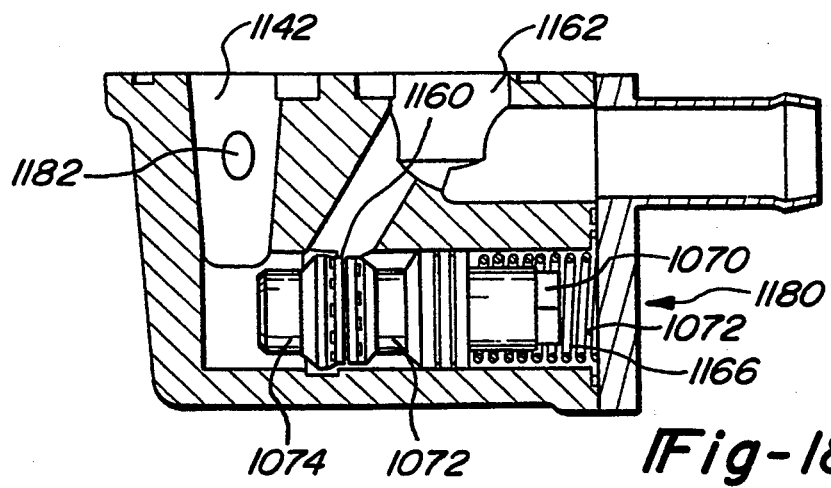
FIGS. 18A, 18B and 18C are orthogonal sectional views of a thirteenth alternative preferred embodiment of a flow control device according to the invention.
Figure 18B:
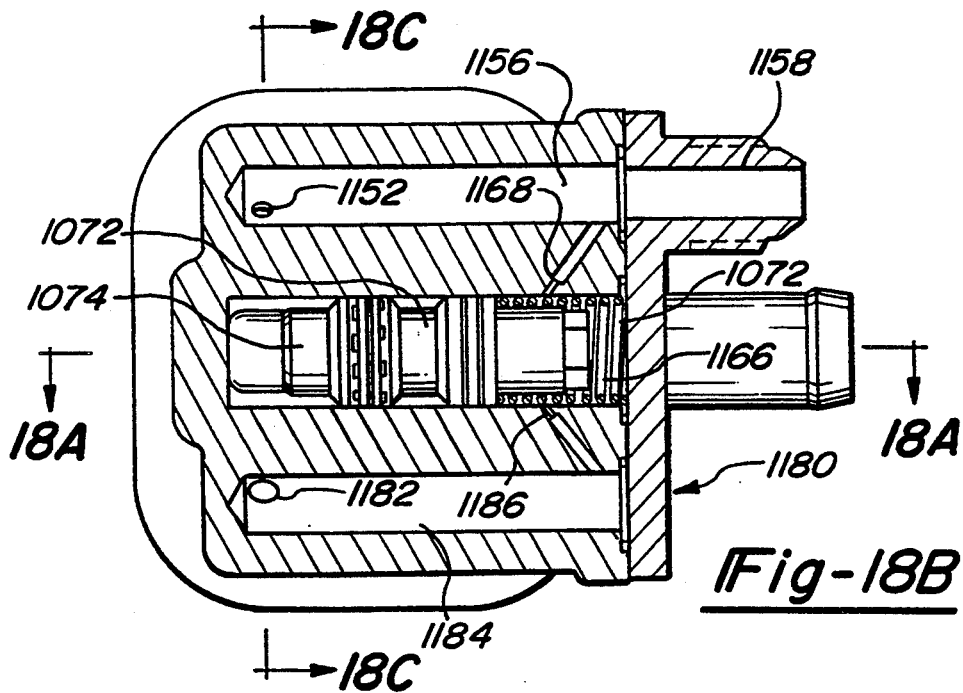
Figure 18C:
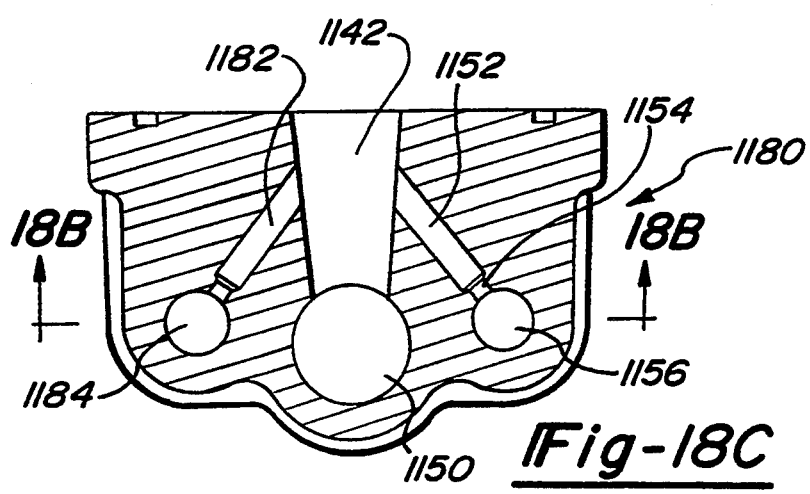

A thirteenth alternative preferred embodiment of a flow control device 1180 is shown in FIGS. 18A, 18B and 18C. The flow control device 1180 includes all of the components of flow control device 1140. As such, like reference numerals are used in FIGS. 17A, 17B and 17C and 18A, 18B and 18C to identify like components. In addition, flow control device 1180 comprises interconnecting passage 1182 from which biasing flow passes to high pressure passage 1184 and on into low pressure chamber 1166 via metering passage 1186. The biasing flow then passes through pressure sensing orifice 1168 to output passage 1156 and out through output fitting 1158. As described above, the passage of biasing flow through pressure sensing orifice 1168 results in pressure drop and concomitant hydraulic resistance therethrough which damps any resonance. As before, the metering passage 1186 is sized somewhat smaller than that of pressure sensing orifice 1168 (i.e., its bore diameter being perhaps 50% to 70% thereof). And, output flow control orifice 1154 is somewhat reduced in size to compensate for slightly higher pressure drop therethrough and for the biasing flow portion of the fluid now delivered to the steering gear.

In addition, use of a bifurcated piston sub-assembly such as bifurcated piston sub-assembly 1072 described above with reference to FIGS. 15A, 15B and 16 is beneficial in eliminating net pump flow ripple. In fact, it has been found that use of bifurcated piston assemblies results in suppression of lower frequency harmonics of pump moan. Pump moan is due to higher frequency minute flow pulsations in pump output resulting from passage of each vane (or gear tooth in the case of some gear type power steering pumps) across pump ports. Pump moan is most noticeable when its fundamental or harmonic frequencies match delivery line resonances. Because valve elements of bifurcated pistons such as valve element 1074 of bifurcated piston sub-assembly 1072 do not encounter mechanical resonance below 2,000 Hz, pump moan sourced pump flow fluctuations to at least 1,200 Hz are also preferentially passed directly back to the input port of the power steering pump.

Thus, above disclosed are various methods and devices for reducing the instability in the hydraulic system described above. One method is to moderate the resonances of the flow control piston by forming grooves or notches in the piston end and/or bore adjacent the bypass hole to result in a gradual closing of the piston/bypass hole interface. The second method is to eliminate hydraulic resonance by forming a hydraulic resistor in the circuit. The pressure sensor orifice may be used as a hydraulic resistor or it may be coupled to a hydraulic resistor having a value which would critically dampen the resonance of the sub-circuit.

Figure 19:
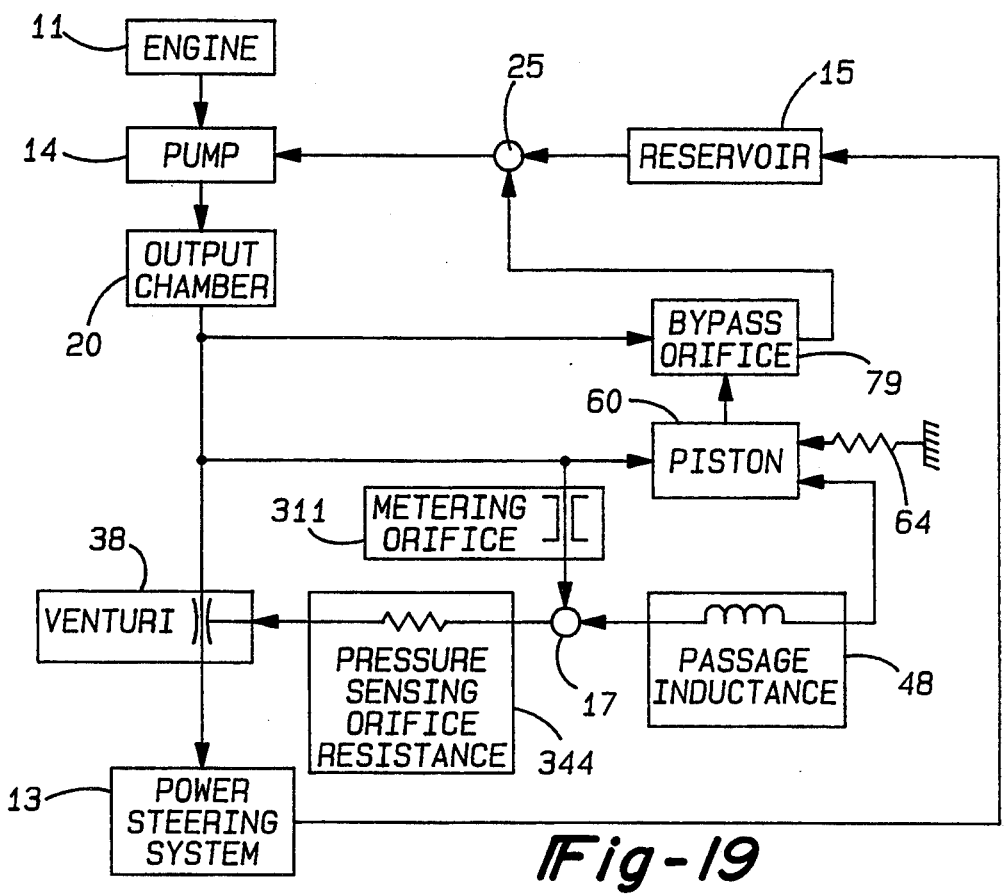
FIG. 19 is a block diagram showing a preferred method of eliminating shudder according to the invention.

A preferred method of eliminating the spring-mass resonance of the piston 60 which includes forming series hydraulic resistance in the flow circuit is shown in FIG. 19, wherein the host system is shown in its flow control mode. In the discussion that follows each block is identified by the component or subsystem name shown therein. In FIG. 19, an engine 11 is depicted as driving a pump 14 which provides pumped fluid to an output chamber 20. The pressure associated with the pumped fluid in the output chamber 20 is applied to a first end (i.e., the high pressure end) of a piston 60 and a first, and small, portion of the fluid flowing from the output chamber 20 flows through a metering orifice 311 and via a summing point 17 through a pressure sensing orifice 344 to a venturi 38. As explained above, the continuous flow through the pressure sensing orifice 344 creates a flow resistance to supplemental flow modulation therethrough. Supplemental flow modulation occurs as a function of variations in measured pressure differential between the output chamber 20 and the venturi 38, which supplemental flow modulation is applied to the piston 60 through an inductance of passageway 48.

The second, and larger, portion of the fluid flowing from the output chamber flows directly through the venturi 38 where it is combined with the first portion and all of the fluid flows on to the rest of the power steering system 13. The fluid is returned from the power steering system to the reservoir 15 and the basic flow circuit is completed by fluid passing from the reservoir to the pump via a summing point 28. A bypass orifice 79 is created by motions of the piston 60 as dictated by the supplemental flow modulation. Any excess pumped fluid is returned to the pump 14 via the bypass orifice 79.

In operation, modulation of the bypass orifice 79 by the piston is very smooth and controlled. This is because the spring-mass system described above in relation to the block diagram shown in FIG. 1 has been functionally modified by the addition of the flow resistance by way of the metering passageway 311 to the supplemental flow modulation. To ensure this desirable characteristic, the components are chosen such that the resistance value is sufficient to overdamp motions of the spring-mass sub-system comprising the piston 60. The result is a dramatic reduction in low frequency steering shudder.

Figure 20:
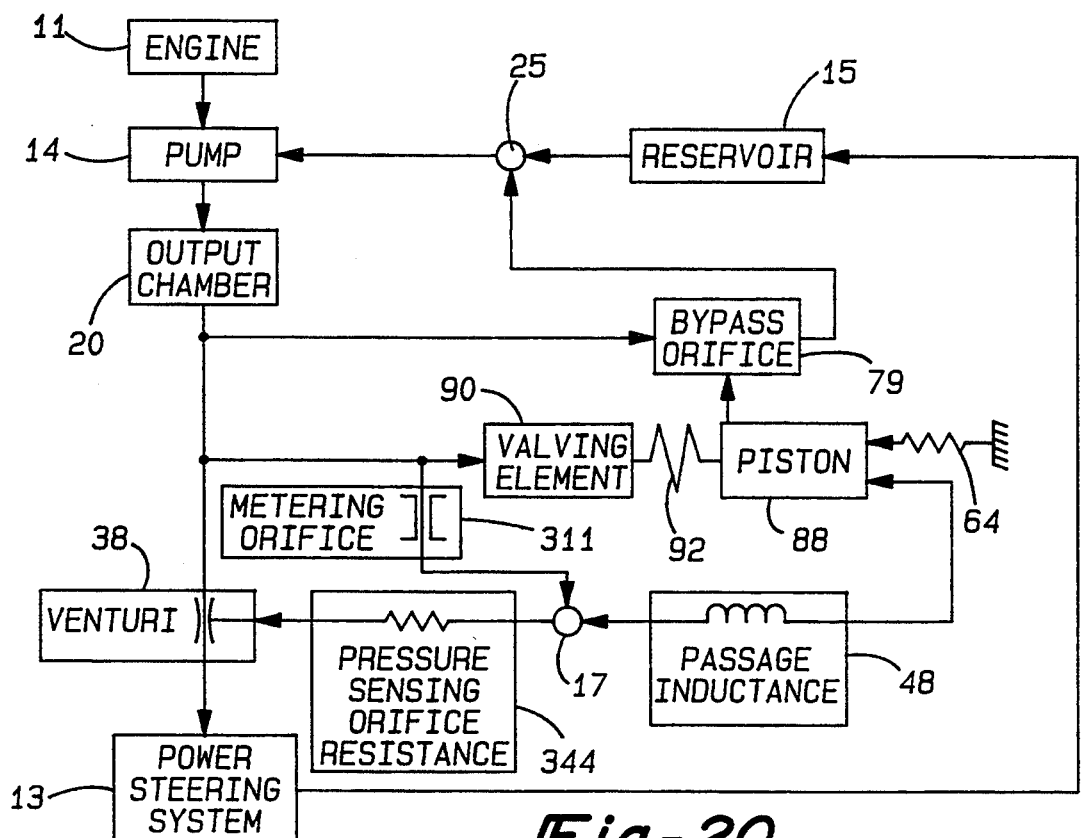
FIG. 20 is a block diagram showing an alternative preferred method of eliminating shudder according to the invention.

A method of suppressing undesired enhancement of the flow rate ripple is shown in FIG. 20. The method includes decoupling the valving action of the piston 660 from the inductance associated with the passageway 48 leading to the pressure sensing orifice 644 from the low pressure chamber 62 so that the valving action can successfully bypass fluctuations of the pump output flow directly through the bypass orifice 679. In FIG. 20, the host system is shown in its flow control mode. It is understood that this may optionally comprise the method of extending the active flow controlling mode to lower flow values by utilizing an over-size high pressure end 882 of the controlling piston assembly mentioned below.

The block diagram of FIG. 20 comprises all of the elements of the block diagram as depicted in FIG. 19. In addition, the piston 60 is replaced, or its function enhanced, by utilizing the features described above in the sixth through ninth alternative preferred embodiments, as identified in FIG. 20 by a valving element 90 and a spring 92. Thus, high frequency motions of the valving element 90 relative to piston 88 are constrained only by its compliant mounting via the spring 92. Thus, fine variations in the size of the bypass orifice 94 occur without concomitant motions of the piston 88 and flow of fluid through the inductance passageway 48 and pressure sensing orifice 44 resistance.

In operation, the method suppresses a significant portion of the high frequency pressure pulsations, otherwise present at the bypass orifice 94 as a consequence of engine speed ripple. The effectiveness of this suppression can be quantified by comparing resulting modulation flow resistance to flow through the bypass orifice 79 with the parallel flow resistance of the flow through the power steering system. For instance, by utilizing the compliant disk valve 988 described in relation to the ninth alternative preferred embodiment above, modulation flow resistances through the bypass orifice in the order of 10 [lb.sec/in$^5$] can be obtained. This compares with flow resistances through the power steering system of perhaps 100 [lb.sec/in$^5$] for a power steering system utilizing 7.5 [in$^3$/sec] and operated at 750 [lb/in$^2$] (i.e., 750 [lb/in$^2$]/7.5 [in$^3$/sec]=100 [lb.sec/in$^5$]). Thus, a ten-fold reduction in shudder results because over 90% of the high frequency variations in flow passing into the output chamber 20 are sent right back to the pump 14 via the bypass orifice 94 and summing point.

Below disclosed are various other methods and devices for reducing the instability in the hydraulic system described above in FIG. 1. One method is to eliminate possible resonances of the flow control piston when flow is insufficient to achieve normal flow control by providing a flow bypass for pumped fluid entering the output fitting 24, thereby eliminating an unstable flow condition between the piston 60 and the output fitting 24. Another method is to moderate flow non-linearities associated with abrupt closure of the bypass orifice 79 by providing notches in the piston end or bore adjacent to the bypass orifice to result in a gradual closing of the bypass orifice.

In addition, because many of the improved methods described above are effective when the flow control is disposed in its active flow controlling mode, a method of extending that flow controlling mode to lower flow values associated with high pressure operation of undersized pumps operated at idle speed was shown. That method comprises the utilization of an oversized high pressure end of the piston or piston assembly. Thus, application of the high pressure to the difference of area between high and low pressure ends of the piston or piston assembly partially overcomes spring force with the result that lower values of reduced pressure are required with the result that concomitant lower values of regulated flow are provided by host the flow control device when it is operated at high pressures.

I claim:

1. A bifurcated piston sub-assembly for use in a flow control device, said bifurcated piston subassembly comprising:
   a piston having a first circumferential portion for sealingly locating said piston laterally in a cylinder, and a first substantially concentric internal threaded portion;
   a valve element having an outer circumference for sealingly locating said valve element laterally in an extended portion of said cylinder, said valve element being slidingly mounted to said piston, and a second substantially concentric internal threaded portion;

means for biasing said valve element with reference to said piston;

tension spring means threadingly engaged with both first and second substantially concentric internal threaded portions;

means for anchoring said tension spring means to said first substantially concentric internal threaded portion; and means for anchoring said tension spring means to said second substantially concentric internal threaded portion.

2. A bifurcated piston sub-assembly for use in a flow control device, said flow control device having a bypass hole communicating with a cylinder, said cylinder having one end communicating with an output chamber, said bifurcated piston sub-assembly comprising:

a piston assembly having a piston member, a valve element, and means for movably connecting said valve element with said piston member, said valve element having an end surface in fluid communication with said pressurized fluid and said first end of said cylinder, said piston assembly further having means for biasing said valve element in a direction towards said output chamber whereby said valve element is movable independently of said piston member to pass fluctuations of pump output to said bypass hole when said fluctuation overcomes the force of said means for biasing.

3. The flow control device of claim 2, wherein said means for biasing comprises at least one Belleville washer.

4. The flow control device of claim 2, wherein said valve element has an outer circumference for sealing and locating said valve element laterally in an extended portion of said cylinder, said valve element being slidably mounted to said piston, and a second substantially concentric internal threaded portion;

tension spring means threadably engaged with both first and second substantially concentric internal threaded portions;

means for anchoring said tension spring means to said first substantially concentric internal threaded portion; and means for anchoring said tension spring means to said second substantially concentric internal threaded portion.

5. The piston assembly of claim 2, wherein said means for connecting further comprises said piston member having an elongated extension portion and said valve element having an axially aligned bore for receiving said extension portion.

6. The bifurcated piston sub-assembly of claim 2, wherein said piston member comprises an accumulator piston.

7. The bifurcated piston sub-assembly of claim 2, wherein said valve element is a compliant disk valve.

8. The bifurcated piston sub-assembly of claim 2, wherein said means for connecting further comprises said valve element having an elongated portion and said piston member having an axially aligned bore for receiving said elongated portion.

* * * * *